(12) United States Patent
Wilhelmsson et al.

(10) Patent No.: US 7,706,428 B2
(45) Date of Patent: Apr. 27, 2010

(54) LOW COMPLEXITY INTER-CARRIER INTERFERENCE CANCELLATION

(75) Inventors: Leif Wilhelmsson, Dalby (SE); Michael Faulkner, Melbourne (AU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1050 days.

(21) Appl. No.: 11/350,807

(22) Filed: Feb. 10, 2006

(65) Prior Publication Data

US 2006/0239367 A1  Oct. 26, 2006

Related U.S. Application Data

(60) Provisional application No. 60/673,384, filed on Apr. 21, 2005.

(51) Int. Cl.
*H04B 1/00* (2006.01)

(52) U.S. Cl. .................. 375/144; 375/141; 375/140; 375/130; 375/260; 375/362; 375/344; 375/356; 375/358; 375/316; 370/203; 370/343; 370/204; 370/206; 370/210; 370/480; 370/482

(58) Field of Classification Search .......... 375/144, 375/141, 140, 130, 260, 362, 344, 356, 358, 375/316; 370/203, 343, 204, 206, 210, 480, 370/482
See application file for complete search history.

(56) References Cited

U.S. PATENT DOCUMENTS

| | | | |
|---|---|---|---|
| 5,357,502 A | | 10/1994 | Castelain et al. |
| 6,088,327 A | | 7/2000 | Muschallik et al. |
| 7,206,349 B2 | * | 4/2007 | Linnartz et al. ............. 375/260 |
| 7,277,512 B1 | * | 10/2007 | Barsoum ..................... 375/346 |
| 2002/0146063 A1 | | 10/2002 | Gorokhov et al. |
| 2002/0163983 A1 | | 11/2002 | Redfern |
| 2002/0181625 A1 | * | 12/2002 | Gorokhov et al. ........... 375/346 |
| 2004/0022175 A1 | | 2/2004 | Bolinth et al. |
| 2004/0151254 A1 | * | 8/2004 | Yang et al. .................. 375/260 |
| 2004/0184550 A1 | * | 9/2004 | Yoshida et al. .............. 375/260 |

(Continued)

OTHER PUBLICATIONS

PCT International Search Report, dated Aug. 22, 2006, in connection with International Application No. PCT/IB2006/000962.

(Continued)

*Primary Examiner*—David C Payne
*Assistant Examiner*—Zewdu Kassa
(74) *Attorney, Agent, or Firm*—Potomac Patent Group PLLC

(57) ABSTRACT

Inter-carrier interference (ICI) in a kth sub-carrier of an orthogonal frequency division multiplexing (OFDM) signal received at time t is reduced, wherein the received OFDM signal comprises a plurality of sub-carriers. This is achieved by generating a self-interference term, $ICI_{k-L,k-L}$, for a signal received on sub-carrier k−L, wherein $L \in [\ldots, -3, -2, -1, 1, 2, 3, \ldots]$, and wherein the self-interference term is an estimate of the data received at time t on the sub-carrier k−L, weighted by a rate of change of the channel through which sub-carrier k−L passes at time t. An ICI cancellation coefficient, $G_L$ is obtained, and an estimated ICI term is generated by adjusting the self-interference term, $ICI_{k-L,k-L}$, by an amount based on the ICI cancellation coefficient, $G_L$. The estimated ICI term is then subtracted from a term representing a signal received on the kth sub-carrier at time t.

29 Claims, 21 Drawing Sheets

U.S. PATENT DOCUMENTS

2005/0129136 A1*  6/2005  Fujii et al. ............... 375/260
2008/0095226 A1*  4/2008  Bar-Ness et al. ............ 375/233
2008/0129136 A1*  6/2008  Abe et al. .............. 310/156.35
2008/0304585 A1* 12/2008  Song ..................... 375/260

OTHER PUBLICATIONS

PCT Written Opinion, dated Aug. 22, 2006, in connection with International Application No. PCT/IB2006/000962.

Suzuki, N. et al.: "A New OFDM Demodulation Method to Reduce Influence of ISI Due to Longer Delay than Guard Interval" Communication Systems, 2002. ICCS 2002. The $8^{th}$ International Conference on Nov. 25-28, 2002. Piscataway, NJ, USA, IEEE, vol. 1, Nov. 25, 2002, XP010629217.

Armstrong, Jean: "Analysis of New and Existing Methods of Reducing Intercarrier Interference Due to Carrier Frequency Offset in OFDM" IEEE Transactions on Communications, IEEE Service Center, Piscataway, NJ, US, vol. 47, No. 3, Mar. 1999, XP011009358.

Suyama, Satoshi et al.: "A Maximum Likelihood OFDM Receiver with Smoothed FFT-Window for Large Multipath Delay Difference over the Guard Interval" IEEE, VTC, 2002.

Muschallik, Claus: "Improving an OFDM Reception Using an Adaptive Nyquist Windowing" IEEE Transactions on Consumer Electronics, vol. 42, No. 3, Aug. 1996.

Müller-Weinfurtner, Stefan H.: "Optimum Nyquist Windowing in OFDM Receivers" IEEE Transactions on Communications, vol. 49, No. 3, Mar. 2001.

Yang, Hongwei et al. "An Adaptive ICI Self Cancellation Scheme to Compensate the Frequency Offset for OFDM System" Vehicular Technology Conference VTC Spring 2003; Apr. 22-25, 2003, vol. 4, pp. 2658-2662 ISSN 1090-3038.

PCT International Preliminary Report on Patentability, completed Jun. 21, 2007, in connection with International Patent Application No. PCT/IB2006/000962.

* cited by examiner

Table 1 The cancellation coefficients, $j\pi G_L$ for different '3-step' window sizes, W (wrt FFT size)

| $j\pi G_L$ | L=1 | L=2 | L=3 | L=4 | L=5 | L=6 | L=7 | L=8 | L=9 | L=10 |
|---|---|---|---|---|---|---|---|---|---|---|
| 0 | 1.0000 | 0.5000 | 0.3333 | 0.2500 | 0.2000 | 0.1667 | 0.1429 | 0.1250 | 0.1111 | 0.1000 |
| 1/32 | 0.9973 | 0.4947 | 0.3254 | 0.2394 | 0.1869 | 0.1510 | 0.1248 | 0.1046 | 0.0884 | 0.0751 |
| 2/32 | 0.9893 | 0.4788 | 0.3020 | 0.2091 | 0.1503 | 0.1089 | 0.0780 | 0.0541 | 0.0354 | 0.0205 |
| 3/32 | 0.9761 | 0.4531 | 0.2652 | 0.1633 | 0.0980 | 0.0530 | 0.0215 | 0.0000 | -0.0138 | 0.0213 |
| 4/32 | 0.9577 | 0.4183 | 0.2178 | 0.1083 | 0.0411 | 0.0000 | -0.0225 | -0.0312 | -0.0301 | 0.0224 |
| 5/32 | 0.9343 | 0.3756 | 0.1633 | 0.0513 | -0.0089 | -0.0354 | -0.0389 | -0.0280 | -0.0107 | 0.0065 |
| 6/32 | 0.9061 | 0.3266 | 0.1061 | 0.0000 | -0.0425 | -0.0451 | -0.0257 | -0.0000 | 0.0200 | 0.0271 |
| 7/32 | 0.8734 | 0.2730 | 0.0503 | -0.0394 | -0.0544 | -0.0300 | 0.0047 | 0.0280 | 0.0291 | 0.0086 |
| 8/32 | 0.8365 | 0.2165 | 0.0000 | -0.0625 | -0.0448 | -0.0000 | 0.0320 | 0.0313 | 0.0000 | -0.0433 |

FIG. 13

LOW COMPLEXITY INTER-CARRIER INTERFERENCE CANCELLATION

CROSS REFERENCE TO RELATED APPLICATIONS

This application claims the benefit of U.S. Provisional Application No. 60/673,384, filed Apr. 21, 2005, which is hereby incorporated herein by reference in its entirety.

BACKGROUND

The present invention relates to digital communication where Orthogonal Frequency Division Multiplexing (OFDM) is employed, and more particularly to cancellation of inter-carrier interference between OFDM sub-carriers.

In an OFDM system, a signal comprises a number of sub-carriers that are independently modulated, each by its own data. The modulation can be in accordance with a number of well-known techniques, such as Quadrature Amplitude Modulation (QAM) or n-ary Phase Shift Keying (n-PSK). The baseband signal in an OFDM system is then the sum of these modulated sub-carriers. The baseband signal is then used to modulate a main radio frequency (RF) signal. An important aspect of demodulating such a signal (thereby retrieving the underlying baseband signal) involves processing it by a Fast Fourier Transform (FFT). An advantage to communicating by means of OFDM is that it allows for communication over highly time-dispersive channels (i.e., due to multi-path propagation of a transmitted signal) using reasonable complexity at the receiver side.

The way to handle large delay spreads for a system based on OFDM is to make use of a guard interval, often referred to in the literature as a "cyclic prefix", ("CP"). The CP is simply a copy of the last part of an OFDM symbol that is sent before the actual symbol. This is schematically illustrated in FIG. 1, which shows a number of symbols. An exemplary one of the symbols 101 includes a last portion 103 that is transmitted as a preceding cyclic prefix 105 (time flows from left to right in the figure). Other cyclic prefixes are similarly formed from end portions of their immediately succeeding symbols.

It is well-known that for a system based on OFDM the effect of the time-dispersive channel, known as inter-symbol interference (ISI), can be avoided provided that the length (i.e., duration) of the CP is at least as long as the (maximum) duration of the impulse response of the channel. Because of the ability of an OFDM system to handle large delay spreads, it is very suitable for so-called Single Frequency Networks (SFN), which might be used for broadcasting. (In a single frequency network, geographically spaced transmitters operate on a same frequency, and are time synchronized with one another.) OFDM is also becoming the choice for other types of wireless communications systems. It is used for Wireless Local Area Networks (WLAN), Broadband Access (Wi-Max), Digital Video Broadcasting (DVB), Digital Audio Broadcasting (DAB), and it has been proposed for the fourth generation (4G) of mobile communications equipment.

A major technical problem facing OFDM systems is their susceptibility to frequency offsets, phase noise, and Doppler effects when the channel is rapidly changing. These problems cause inter-carrier interference (ICI) between the OFDM sub-carriers, resulting in high bit error rates.

More particularly, ICI is caused by lack of orthogonality between the signals received on different sub-carriers. Since the orthogonality is in frequency, things like frequency error, phase noise, and Doppler spread will all cause a loss of orthogonality. The effect of frequency error and phase noise can in theory, and also often in practice, be made small enough by proper design. However, ICI caused by Doppler spread will be present even in an ideal receiver because it is caused by channel variations.

For a text-book OFDM system, the power of the ICI, $P_{ICI}$, caused by Doppler spread when Jakes' Spectrum is assumed is given by $$P_{ICI} = \frac{\pi^2}{6}\left(\frac{f_D}{\Delta f}\right)^2,$$

where $f_D = f_c v/c$ is the maximum Doppler frequency, and $\Delta f$ is the carrier spacing between the sub-carriers. Here, $f_c$ is the carrier frequency, v is the relative speed between receiver and transmitter and $c = 3 \times 10^8$ m/s is the speed of light. When designing an OFDM system, this understanding of ICI can be used to ensure that ICI caused by Doppler effects will not be a problem by making $\Delta f$ sufficiently large in relation to the expected Doppler shift.

To date most OFDM applications have been for fixed or low mobility applications (low Doppler). More recently, however, high mobility services have been targeted, (e.g., DAB, DVB-H, and 4G.) Such systems require improved performance when the experienced Doppler effects are high.

For example, Doppler shifting is an issue for DVB-H systems because DVB-H is designed to be backward compatible with the older DVB-T system, rather than being designed from scratch. The DVB-T system was originally designed for receivers with low mobility; in most cases, the receiving antenna is placed on the roof-top of a building, and therefore completely stationary. Since DVB-H is targeting highly mobile devices, one can say that the system is not properly designed. To a certain extent, the 4k mode introduced in DVB-H (in which the size of the FFT is 4k compared to the 8k FFT that is normally used in DVB-T systems) is an attempt to improve Doppler tolerance for the system.

For the DVB-H system in the United States, Doppler shifts are even more of an issue. The reason for this is twofold: First, the carrier frequency is 1.67 GHz, which is roughly twice the highest frequency under consideration elsewhere for DVB-H. Second, the bandwidth of the U.S. system is only 5 MHz. The former means that $f_D$ will be at least twice as high for the same vehicle speed, whereas the latter means that the carrier spacing $\Delta f$ is reduced by a factor of ⅝ compared to the 8 MHz system.

OFDM performance in Doppler or with frequency offset is improved by using fewer sub-channels. Reducing the number (N) of sub-channels permits a corresponding decrease in the symbol duration. However, this leads to a drop in transmission efficiency because the length of the cyclic prefix cannot be reduced accordingly due to channel delay spread considerations. The cyclic prefix length is designed to cover the longest delay spread expected on the channel. As such, in normal operation, this is generally wasteful since the longest delay spread hardly ever occurs.

One method for improving OFDM Doppler performance is using more robust modulation (e.g., as in DAB). Another is adding an additional layer of coding (e.g., as in DVB-H). Yet another is introducing a special code for minimum degradation due to ICI, such as repetition coding (transmitting the same data on adjacent sub-channels). All of these schemes suffer from reduced throughput due to the smaller modulation alphabet or the increased coding overhead.

Other methods include performing ICI cancellation in the receiver. A matrix of coefficients is formed describing the ICI coupling into adjacent channels. The received signal is then multiplied by the inverse of this matrix to remove the ICI effects. The scheme is complex because many sub-carriers contribute to the ICI, especially when the signal to noise requirement is high as it is for high data rate systems using high level modulations, such as 64 QAM.

There is therefore a need for techniques for improving the performance of OFDM-based systems for use in environments in which the experienced Doppler effects are high.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

Methods and apparatuses consistent with the invention reduce inter-carrier interference (ICI) for a kth sub-carrier of an orthogonal frequency division multiplexing (OFDM) signal received at time t, wherein the received OFDM signal comprises a plurality of sub-carriers. In accordance with one aspect of the present invention, this involves generating a self-interference term, $ICI_{k-L,k-L}$, for a signal received on sub-carrier k−L, wherein L ∈ [ . . . , −3, −2, −1, 1, 2, 3, . . . ] (e.g., in some embodiments L=±1), and wherein the self-interference term is an estimate of the data received at time t on the sub-carrier k−L, weighted by a rate of change of the channel through which sub-carrier k−L passes at time t. An ICI cancellation coefficient, $G_L$ is obtained, wherein the ICI cancellation coefficient, $G_L$, is determined as a function of a window function. An estimated ICI term is generated by adjusting the self-interference term, $ICI_{k-L,k-L}$, by an amount based on the ICI cancellation coefficient, $G_L$. The estimated ICI term is subtracted from a term representing a signal received on the kth sub-carrier at time t.

In some embodiments, obtaining the ICI cancellation coefficient, $G_L$, includes retrieving the ICI cancellation coefficient, $G_L$, from a table stored in a memory device.

In another aspect, the term representing the signal received on the kth sub-carrier at time t is obtained by applying the window function to the received OFDM signal to generate a set of selected weighted samples, wherein a symbol transmitted on the OFDM signal is represented by N samples; the window function has a size that is greater than N; the set of selected weighted samples comprises a central portion of samples, and at least one of an initial portion of samples and a final portion of samples; and the central portion of samples consists of N samples. In preferred embodiments, the window function is a Nyquist window. A wrap function is then performed on the set of selected weighted samples to generate a set of N combined weighted samples by, if the set of selected weighted samples includes the initial portion of samples, then combining the initial portion of samples with a like number of samples selected from the central portion of samples, and by, if the set of selected weighted samples includes the final portion of samples, then combining the final portion of samples with a like number of samples selected from the central portion of samples. A Fast Fourier Transform is then performed on the N combined weighted samples.

The window function can conform to any of a great number of alternatives. For example, in some alternative embodiment the window function is a 3-step window that begins with a step function that increases from a minimum value to a first intermediate value, stays at the first intermediate value over a first period of time, then increases from the first intermediate value to a second intermediate value, stays at the second intermediate value over a second period of time, then increases from the second intermediate value to a third intermediate value, stays at the third intermediate value over a third period of time, then with another step function increases from the third intermediate value to a maximum value, remains at the maximum value for a fourth period of time, then with a step function decreases from the maximum value to the third intermediate value, remains at the third intermediate value for a fifth period of time, then with a step function decreases from the third intermediate value to the second intermediate value, remains at the second intermediate value for a sixth period of time, then with a step function decreases from the second intermediate value to the first intermediate value, remains at the first intermediate value for a seventh period of time, and then with a step function decreases from the first intermediate value to the minimum value.

In another aspect relating to these embodiments, the ICI cancellation coefficient is determined in accordance with:

$$G_L = \left( \frac{\cos(\pi L W_{REL}) + \cos\left(\pi L \frac{W_{REL}}{3}\right)}{2j\pi L} \right),$$

wherein $W_{REL}$ is a size of a roll-off region of the window-function relative to N.

In other alternative embodiments, the window function is a 1-step window that begins with a step function that increases from a minimum value to an intermediate value, stays at the intermediate value over a first period of time, then with another step function increases from the intermediate value to a maximum value, remains at the maximum value for a second period of time, then with a step function decreases from the maximum value to the intermediate value, remains at the intermediate value for a third period of time, and then with a step function decreases from the intermediate value back to the minimum value.

In another aspect, the symbol transmitted on the OFDM signal is preceded by a cyclic prefix; and reducing the ICI involves estimating an amount of time dispersion of a channel through which the sub-carrier k passes; and adjusting the size of the window function such that it is greater than N but not large enough to extend into a portion of the cyclic prefix that is affected by the time dispersion of the channel.

In still another aspect, embodiments consistent with the invention include selecting a shape of the window function based on a length of the window function.

In yet another aspect, embodiments consistent with the invention include selecting a shape of the window function based on a number of bins being canceled in the OFDM signal received at time t.

In still another aspect, embodiments consistent with the invention include estimating the self-interference term, $ICI_{k-L,k-L}$, in accordance with:

$$ICI_{k-L,k-L} = \hat{D}_{k-L}(t)\hat{H}_{k-L}'(t)$$

where $\hat{D}_{k-L}(t)$ is an estimate of the data transmitted on sub-carrier k−L at time t, and $\hat{H}_{k-L}'(t)$ is an estimate of the derivative of the channel for sub-carrier k−L at time t. In some of these embodiments, $\hat{D}_{k-L}(t)$ is determined by using a decision directed technique.

In yet other embodiments, the self-interference term, $ICI_{k-L,k-L}$, is determined in accordance with:

$$ICI_{k-L,k-L} = \left(\frac{1}{\hat{H}_{k-L}(t)}\right)(D_{k-L}(t)H_{k-L}(t))\left[\frac{(\hat{H}_{k-L}(t+T_N+T_{cp}) - \hat{H}_{k-L}(t-T_N-T_{cp}))}{4(1+T_{cp}/T_N)}\right]$$

where:

$T_N$ is a time duration corresponding to N samples representing a symbol in the OFDM signal;

$T_{cp}$ is a time duration of a cyclic prefix that precedes the symbol;

$\hat{H}_{k-L}(t)$ is a current channel estimate for sub-carrier k–L;

$\hat{H}_{k-L}(t+T_N+T_{cp})$ is a next channel estimate for sub-carrier k–L;

$\hat{H}_{k-L}(t-T_N-T_{cp})$ is a previous channel estimate for sub-carrier k–L;

$D_{k-L}(t)$ is a signal actually transmitted at time t on sub-carrier k–L; and $H_{k-L}(t)$ is an actual channel on sub-carrier k–L at time t.

In still another aspect, reducing the ICI involves comparing the estimated ICI term with a predetermined Signal-to-Noise Ratio (SNR), and then subtracting the estimated ICI term from the term representing the signal received on the kth sub-carrier at time t only if the comparison of the estimated ICI term with the predetermined SNR satisfies a predetermined criterion.

BRIEF DESCRIPTION OF THE DRAWINGS

The objects and advantages of the invention will be understood by reading the following detailed description in conjunction with the drawings in which:

FIG. 13 is a table showing cancellation coefficients calculated for a 3-step window function.

DETAILED DESCRIPTION

Figure 1:
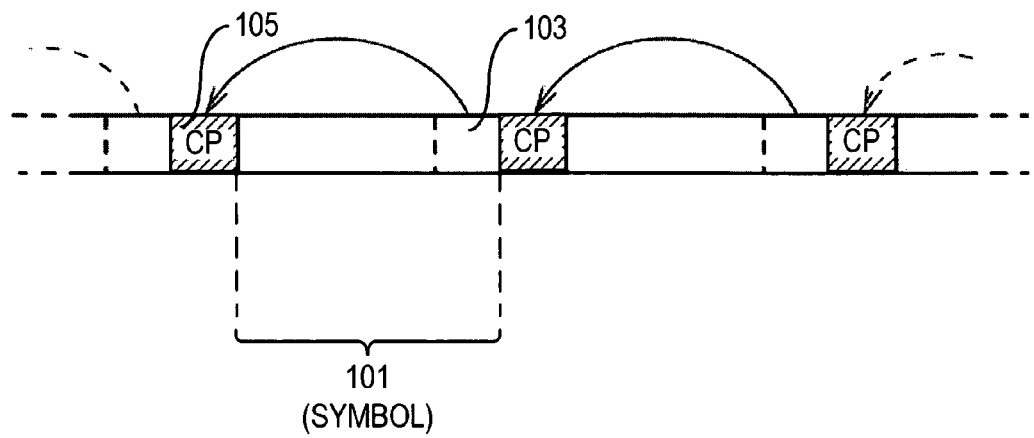
FIG. 1 is a schematic illustration of symbols separated by cyclic prefixes in an orthogonal frequency division multiplexing (OFDM) system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In one aspect of some exemplary embodiments described herein, a non-rectangular window function is applied to the received signal at the receiver. Non-rectangular windowing reduces the ICI problem from frequency offsets and Doppler channels, and at least marginally improves the received signal to noise ratio. Non-rectangular windowing is particularly effective when it comes to reducing the ICI from carriers that are relatively far away from the carrier experiencing the interference. That is, by applying windowing, the total ICI experienced is dominated by the very closest sub-carriers. This, in turn, implies that if ICI cancellation is employed, fewer ICI terms need to be cancelled, thereby reducing complexity.

In another aspect of some exemplary embodiments described herein, an adaptive process is used to change the window size. The window expands to use up any excess cyclic prefix time, not corrupted by channel delay spread. In this way, a receiver tuned to a channel with low delay spread can make use of the unnecessary portion of the CP to improve its performance in Doppler environments.

In still another aspect of some exemplary embodiments described herein, a simplified ICI canceling routine is used. In embodiments in which various aspects are combined, the simplified ICI canceling routine takes advantage of the non-rectangular windowing to reduce the number of channels involved in the ICI cancellation. Non-rectangular windowing also reduces the number of correction coefficient values.

These and other aspects will now be described in greater detail in the following discussion. To facilitate an understanding of the various aspects, it is helpful to compare inventive embodiments with conventional embodiments.

Figure 2:
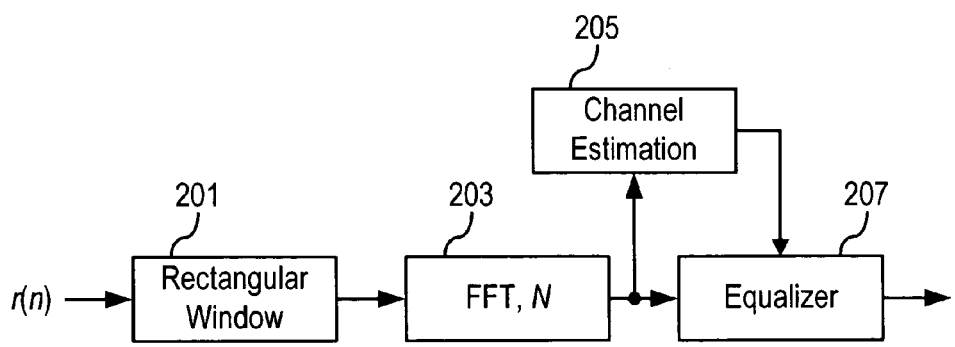
FIG. 2 is a block diagram of a conventional OFDM receiver.
Figure 3:
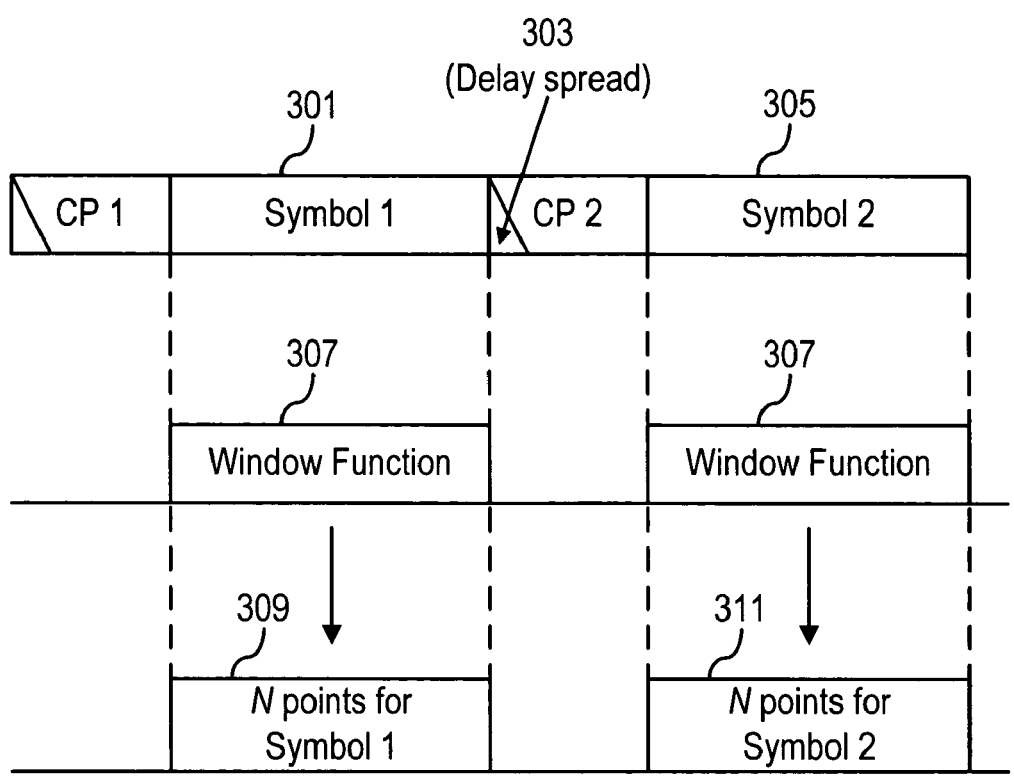
FIG. 3 is diagram illustrating the operation of a conventional rectangular window function

FIG. 2 is a block diagram of a conventional OFDM receiver. A digitized received signal, r(n), is subjected to a conventional rectangular window function 201, which selects N contiguous signal samples corresponding to the duration of one symbol. The operation of the conventional rectangular window function 201 is illustrated in FIG. 3. In FIG. 3, time flows from left to right. It can be seen that a first symbol 301 is preceded by its corresponding cyclic prefix (CP 1). Due to the channel's delay spread 303, a last portion of the signal representing the first symbol 301 overlaps with the cyclic prefix (CP 2) associated with a second symbol 305.

At any instant in time, the conventional rectangular window function 307 takes on one of two possible values, zero and one. The rectangular window function 307 acts as a gate: when its value is zero, the corresponding part of the received signal is not selected. When the window function 307 has a value of one, the corresponding part of the received signal is selected (e.g., allowed to pass through unaffected to the output of the rectangular window function 201). The duration/length of the non-zero part of the rectangular window function 307 is set equal to the duration of a transmitted symbol, so that N sample points are selected directly from the received signal each time the rectangular window function 307 is applied. In FIG. 3, this is illustrated as N samples 309 corresponding to Symbol 1, and N samples 311 corresponding to Symbol 2.

In the figure, the start of the conventional rectangular window function 307 is shown being exactly aligned with the start of each symbol. In practice, it is permissible to start the rectangular window function 307 somewhat earlier (i.e., within the corresponding cyclic prefix for the symbol) so long as the window does not overlap any part of the received signal that has been affected by delay spread (i.e., affected by inter-symbol interference). Starting the conventional rectangular window earlier in this way corresponds to a shift of the N sample points, which may be corrected by known additional processing in the receiver.

Referring back to FIG. 2, each group of N samples from the conventional rectangular window function 201 is supplied to an N-point Fast Fourier Transform (FFT) unit 203, which generates a set of coefficients that represent the information being communicated. The coefficients are supplied to a channel estimator 205 which uses conventional techniques to generate an estimate of the channel. The coefficients are also supplied to an equalizer 207 along with the channel estimate (from the channel estimator 205) so that the effects of multi-path propagation can be removed. The equalization can be performed by a one-tap per sub channel equalizer.

Figure 4:
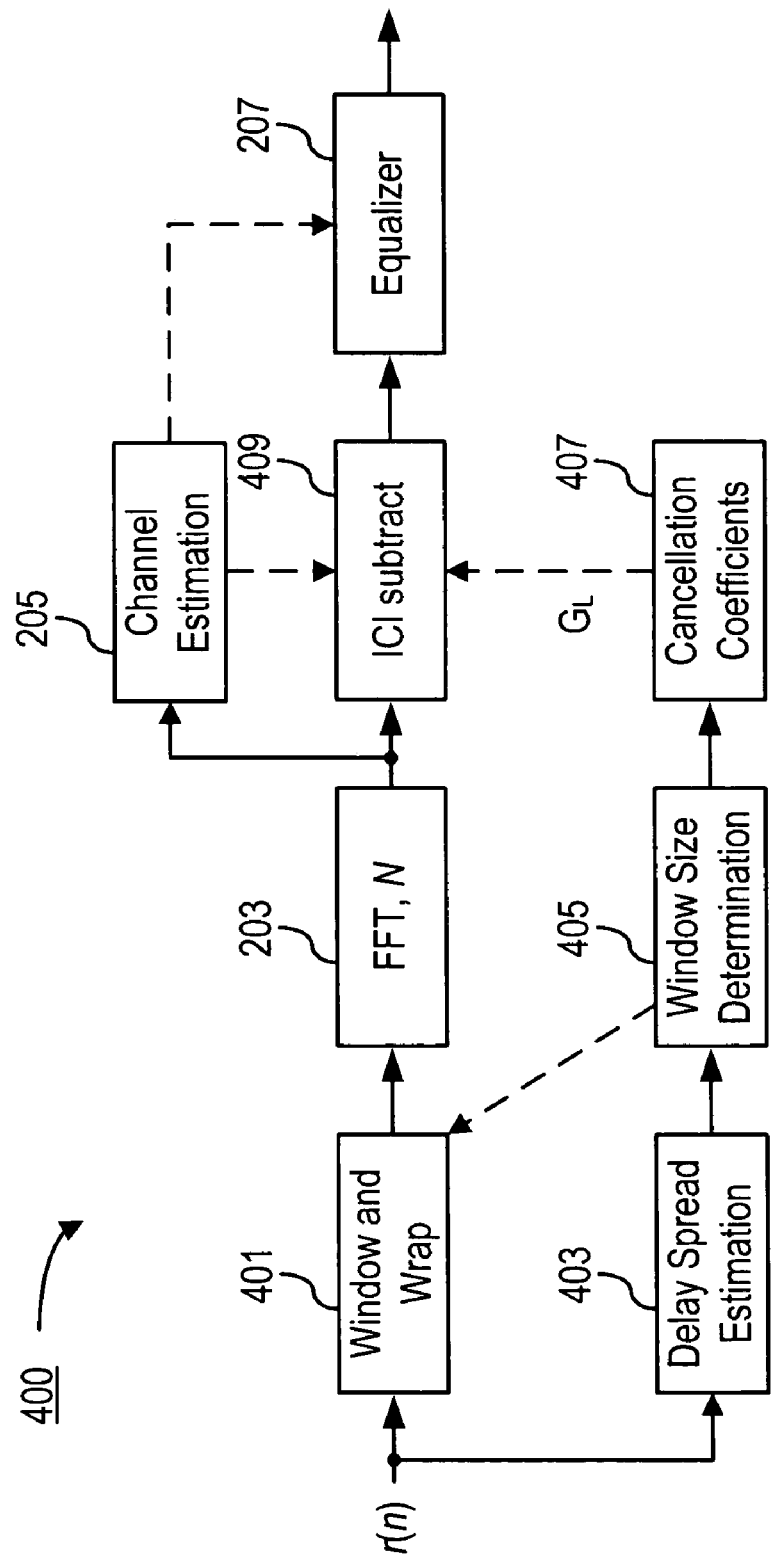
FIG. 4 is a block diagram of an exemplary embodiment of an OFDM receiver in accordance with a number of aspects of the invention.

FIG. 4 is a block diagram of an exemplary embodiment of an OFDM receiver 400 in accordance with a number of aspects of the invention. In one aspect, the exemplary OFDM receiver 400 differs from a conventional receiver in that the received signal, r(n), is supplied to window and wrap logic 401 instead of a conventional rectangular window function. The operation of the window and wrap logic 401 will now be described with reference to the exemplary process flow diagram shown in FIG. 5.

Figure 5:
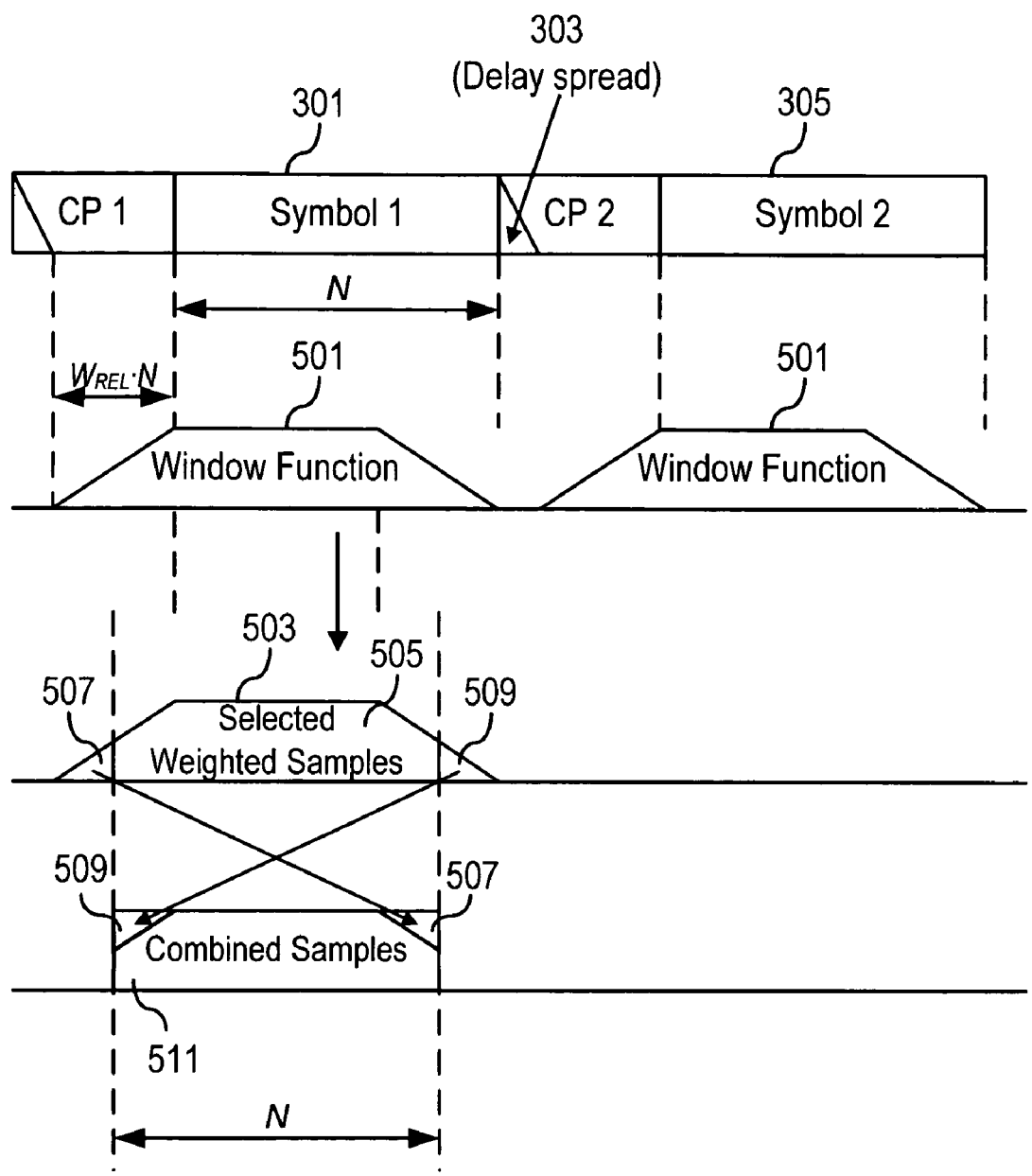
FIG. 5 is an exemplary process flow diagram illustrating the operation of window and wrap logic.

As in FIG. 3, FIG. 5 shows a signal comprising first and second symbols 301, 305 and their respective cyclic prefixes CP1 and CP2. However, instead of a conventional rectangular window, a different window function 501 is utilized. The window function 501 may differ from the conventional rectangular window in several respects. First, it may take on more than just two values, and is consequently not shaped like a rectangle. For example, the window function 501 increases linearly from its minimum value at zero to its maximum value, remains at its maximum value for some period of time, and then decreases linearly back to its zero. As will be described later, this particular window function (which is herein referred to as a "triangle" window) is one of many possible window functions that may be used. The amplitude of the window function at any particular moment weights the corresponding sample that is selected.

The window function 501 also differs from the conventional rectangular window in that its duration need not be limited to the duration of a symbol. Rather, it is preferred to make the window function 501 longer than the duration of a symbol, but not so long that it will overlap with a portion of the cyclic prefix that is affected by the channel's delay spread. In general, the window 501 exceeds the length N of the symbol by an amount $W_{REL} \cdot N$, where $W_{REL} \cdot N$ might be anything from zero to the number of samples in the CP. (This is also the size of the window's "roll-off region". The subscript "REL" is used here to denote that $W_{REL}$ represents the relative size of the roll-off region compared to the length of the symbol.) In the embodiment illustrated in FIG. 5, the window function 501 has taken on its maximum permissible duration for the given amount of channel time dispersion. In other embodiments, shorter durations may also be used.

By applying the window function 501, a set of selected weighted samples 503 is generated. The set of selected weighted samples 503 comprises three portions: a central portion 505 of N samples, an initial portion 507, and a final portion 509. Looking first at the central portion 503, it will be observed that not all of the N samples are weighted at their maximum values. Rather, some number of first samples and some number of final samples of the N samples are weighted at less than their maximum value. Recalling that the information conveyed in a cyclic prefix is identical to the information conveyed in a corresponding last portion of the symbol, it can be seen that the information represented by the first samples of the central portion 505 is identical to the information represented by the final portion 509 of the selected weighted samples 503. Similarly, the information represented by the final samples of the central portion 505 is identical to the information represented by the initial portion 507 of the selected weighted samples 503. The window function 501 is therefore designed in such a way that the weighted samples from the initial portion 507 may be combined with the weighted samples from the final samples of the central portion 505 to yield a set of combined samples, each weighted at its maximum value (i.e., a Nyquist window is used). Further, the weighted samples from the final portion 509 may be combined with the weighted samples from the initial samples of the central portion 505 to yield a set of combined samples, each weighted at its maximum value. In FIG. 5, this is illustrated as the N combined samples 511.

Thus, it can be seen that the window function 501 fulfills the Nyquist condition and is circularly overlapped (wrapped) to obtain the required FFT length of N points. It will be further noted that, in this example, the circular overlapping is symmetric in the sense that the N samples constituting the central portion are in the middle. This is not a requirement, however. An example of a non-symmetric window is also described later in this disclosure.

In some but not necessarily all embodiments, an additional feature is provided in which the window size is dynamically adjusted to ensure that the window function 501 does not coincide with a portion of the cyclic prefix affected by the channel's delay spread. One way of doing this is illustrated in FIG. 4: The received signal, r(n), is supplied to delay spread estimation logic 403 to determine an estimate of the delay spread of the channel. There are a number of known ways of performing this estimation, any of which may be used.

The delay spread estimate is supplied to window size determination logic 405. From an ICI cancellation point of view, it is preferable to use as large a window as possible because this typically gives better performance for the same number of canceled ICI terms; alternatively, a different tradeoff can be made in which fewer ICI terms are canceled while still achieving the same performance as would be obtained with rectangular windowing but with a more complex ICI cancellation scheme. However, a large window can only be used when the maximum delay spread of the channel is significantly smaller than the duration of the cyclic prefix. The window size determination logic 405, therefore, utilizes the estimate of the delay spread of the channel to adapt the duration of the window function 501 preferably to make it as large as possible without selecting samples from the cyclic prefix that have been affected by the channel's delay spread. Since an estimate of the delay spread of the channel is often needed anyway (e.g., for channel estimation), the addition of the window size determination logic 405 constitutes only a minimum of extra complexity to the receiver 400. As shown in FIG. 4, the window size determination logic 405 dynamically adjusts the operation of the window and wrap logic 401 at least to the extent that the duration of the window used by the window and wrap logic 401 is dynamically adjusted.

In alternative embodiments, the delay spread of the channel may be estimated after the FFT unit 203, and a suitable window size then found.

In another aspect of the OFDM receiver 400, window size and shape control generation of cancellation coefficients 407, which might be stored in a lookup table or simply calculated within the receiver 400. Cancellation coefficients, $G_L$, are supplied to ICI subtraction logic 409 which also receives the output from the FFT unit 203 and the channel estimate from the channel estimation logic 205. The ICI subtraction logic 409 subtracts an estimate of the ICI from the FFT output based on the coefficients, $G_L$, estimates of the transmitted signal, and the rate of change of the channel estimate with respect to time. The output from the ICI subtraction logic 409 is then supplied to the equalizer 207, which operates in a conventional manner.

The cancellation process starts by first calculating what is herein referred to as a self-interference term, $ICI_{k,k}$, which is an estimate of the data received at time t on one of the sub-carriers, k, weighted by the (rate of) change of the channel through which sub-carrier k passes at time t. The self-interference term will depend on the rate of change of the channel, which throughout will be assumed to be constant during an OFDM symbol. Moreover, the notation $H_k'(t)$ is used herein to denote the change of the channel during one symbol, whose midpoint is at time t. Note that if $H_k'(t)$ is the change of the channel for one symbol, then the average change of the channel during this symbol compared to what the channel looks like at the start of the symbol is $H_k'(t)/2$. We therefore define the self-interference, $ICI_{k,k}$ as:

$$ICI_{k,k} = D_k(t)H_k'(t)/2$$

Since $D_k(t)$ is the sent data on carrier k, in practice this can, for example, be estimated as $$D_k(t) \approx \frac{R_k}{\hat{H}_k}$$

where $R_k$ is the actually received data ($R_k(t)=D_k(t)H_k(t)$) and $\hat{H}_k$ is the estimate of $H_k$. Alternative ways of estimating $D_k(t)$ include decision directed approaches as well as estimates derived by minimizing the minimum mean square error (MMSE) of the estimate. These ways of estimating data are, by themselves, known in the art. The use of a decision directed approach will be discussed in more detail later in this disclosure in relation to simulation results.

In some embodiments the required logic is further simplified by assuming that the channel changes in a linear way over two or more symbols, so that instead of calculating a derivative term, an average rate of change is simply calculated by determining the difference between channel estimates corresponding to two different moments in time, and dividing by a number representing the time lapse between those two moments. If these approximations are made, one obtains an approximation of the self-interference term given by $$ICI_{k,k} \cong \left(\frac{1}{\hat{H}_k(t)}\right)(D_k(t)H_k(t))$$

$$\left[\frac{(\hat{H}_k(t+T_N+T_{cp}) - \hat{H}_k(t-T_N-T_{cp}))}{4(1+T_{cp}/T_N)}\right]$$

$$\cong \left(\frac{R_k(t)}{\hat{H}_k(t)}\right)$$

$$\left[\frac{(\hat{H}_k(t+T_N+T_{cp}) - \hat{H}_k(t-T_N-T_{cp}))}{4(1+T_{cp}/T_N)}\right]$$

where $T_N$ is the time duration corresponding to N samples, and $T_{cp}$ is the time duration of the cyclic prefix. The "4" in the denominator derives from the fact that the expression for $ICI_{k,k}$ has a factor of 2 in the denominator, and the estimate of the change in the channel during one symbol also has a factor of 2 in the denominator due to it being a difference between channel estimates computed over 2 successive symbols. Each of the three channel terms is available from the channel estimation logic 205. $\hat{H}_k(t)$ is the current channel estimate for sub-carrier k, $\hat{H}_k(t+T_N+T_{cp})$ is the next channel estimate, and $\hat{H}_k(t-T_N-T_{cp})$ is the previous channel estimate. The current received signal from the FFT is $(D_k(t)H_k(t))$ (with $D_k(t)$ being the signal actually transmitted at time t on sub-carrier k, and $H_k(t)$ representing the actual channel on sub-carrier k at time t). Of course, the approximation presented here is simply one of many possible approximations that one could make, all of which are within the scope of the invention.

Figure 6A:
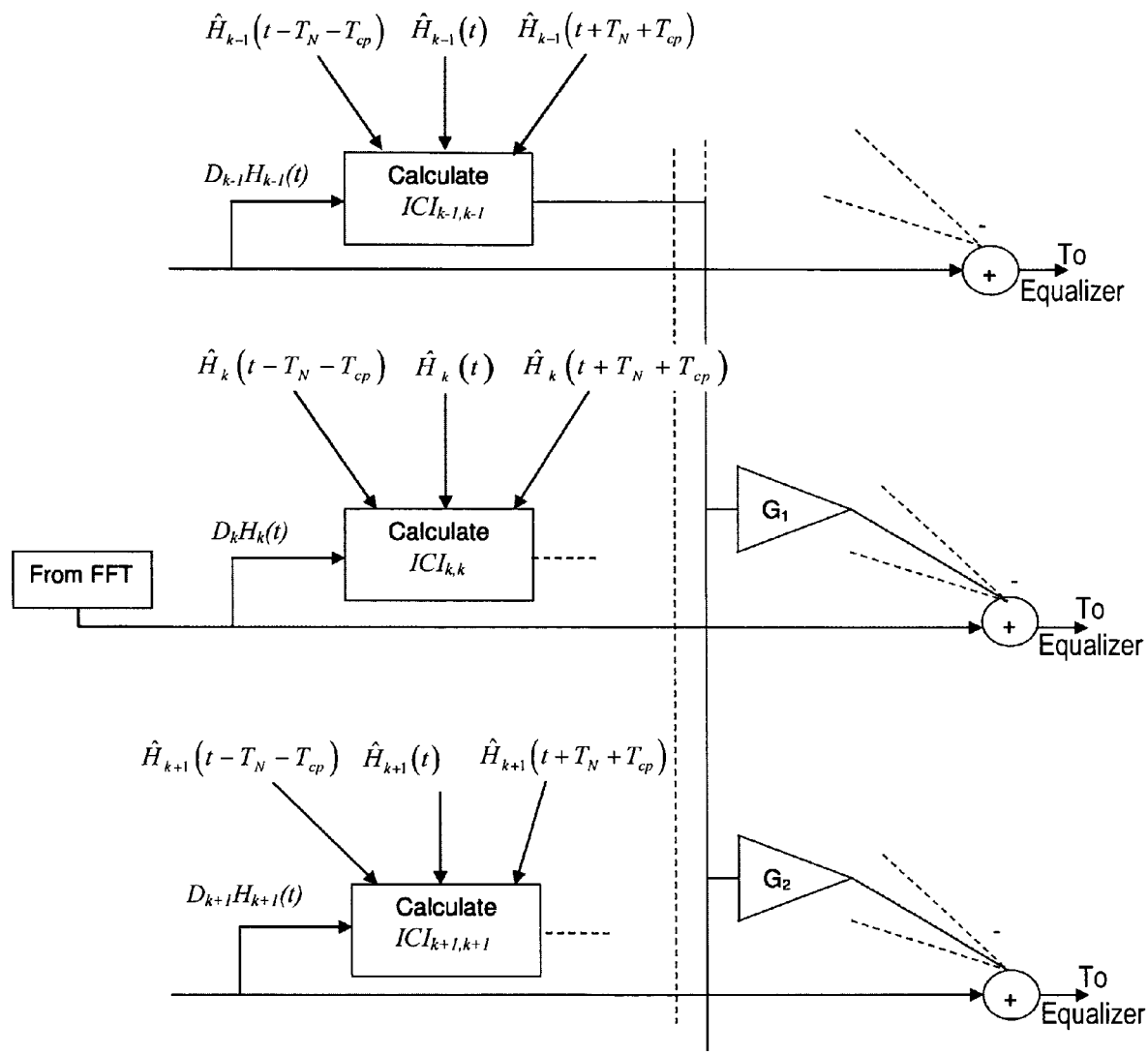
FIG. 6A is a flow diagram of operations performed by ICI subtraction logic in accordance with an aspect of the invention.

Once a self-interference term is determined, it is then weighted by the appropriate coefficient, $G_L$, and subtracted from the adjacent sub-channels. Techniques for determining the ICI cancellation coefficients, $G_L$, are described below. FIG. 6A is a flow diagram of these operations, which are performed by the ICI subtraction logic 409. In brief, for each sub-carrier k, one or more self-interference terms are generated for neighboring sub-carriers k–L (L ∈ [ . . . , –3, –2, –1, 1, 2, 3, . . . ]). These self-interference terms are scaled by an amount $G_L$, and then subtracted from the sub-carrier, k, whose interference is to be reduced. The inverse channel term is often required in the equalization process, so the division term is not necessarily an extra burden.

Figure 6B:
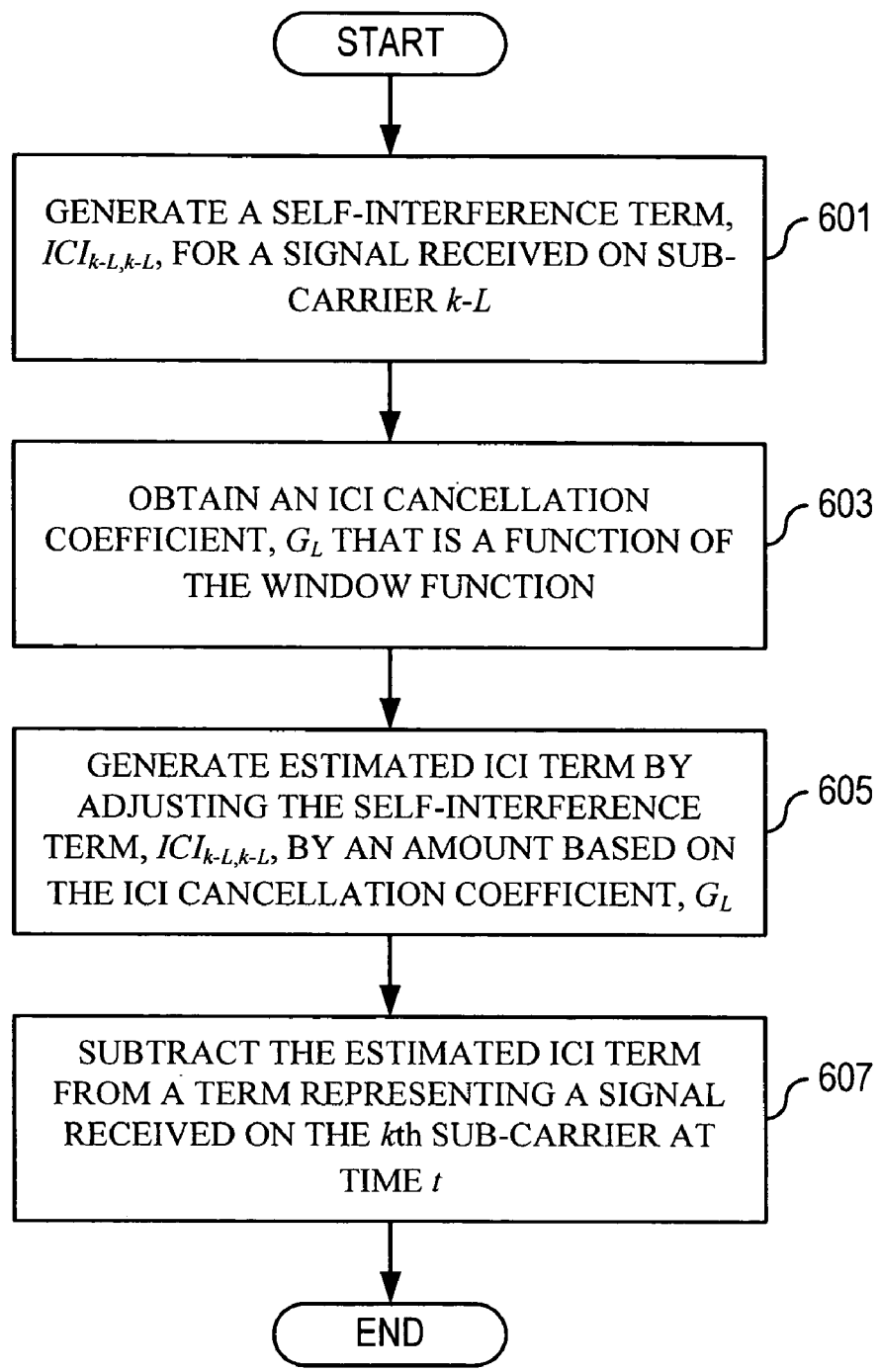
FIG. 6B is a flow chart of exemplary operations performed in carrying out the process depicted in FIG. 6A.

The exemplary process illustrated in FIG. 6A will now be described in greater detail with reference to a flow chart depicted in FIG. 6B. To facilitate this description, the focus of attention will be on a kth sub-carrier of an OFDM signal received at time t, wherein the received OFDM signal comprises a plurality of sub-carriers. The object in this instance is to reduce ICI for the kth sub-carrier. The exemplary process begins by generating a self-interference term, $ICI_{k-L,k-L}$, for a signal received on one or more neighboring sub-carriers k–L, wherein L ∈ [ . . . , –3, –2, –1, 1, 2, 3, . . . ], and wherein the self-interference term is an estimate of the data received at time t on the sub-carrier k–L, weighted by a rate of change of the channel through which sub-carrier k–L passes at time t (step 601).

Next, an ICI cancellation coefficient, $G_L$ is obtained (step 603) that corresponds to the Lth nearest neighbor of sub-carrier k–L. The ICI cancellation coefficient $G_L$ may be, for example, read from a previously stored table of such coefficients, or it may be calculated dynamically. As mentioned earlier, the ICI cancellation coefficient, $G_L$, is determined as a function of the window function.

An estimated ICI term is then generated by adjusting the self-interference term, $ICI_{k-L,k-L}$, by an amount based on the ICI cancellation coefficient, $G_L$ (step 605).

Next, the estimated ICI term is subtracted from a term representing a signal received on the kth sub-carrier at time t (step 607). The number of estimated ICI terms generated from neighboring bins (i.e., the number of values that L takes on) and subtracted from the signal on the kth sub-carrier at time t is application dependent.

The discussion will now focus on techniques for determining the ICI cancellation coefficients. First, consider the case of ICI caused by frequency offset, since frequency offset can be viewed as a special case of Doppler shift, in which the channel change means that the phase is changed during an OFDM symbol. From the fact that the coefficients to be used in case of Doppler shift can be derived by considering frequency offset, it is apparent that the methods and apparatuses described herein are also applicable if the cause for disturbance is, in fact, frequency offset rather than a varying channel. For the sake of completeness, the coefficients are later in this disclosure also derived for a varying channel directly. The results, of course, are the same.

With a rectangular window function, the ICI generated by each frequency bin (k) follows the SINC function when N tends to large and L to small. Thus, the experienced interference, Y(f), is given by:

$$Y(f) = D_k H_k \frac{\sin(\pi f)}{\pi f} \exp\left(j\frac{2\pi}{N} f \frac{N}{2}\right) = D_k H_k \frac{\sin(\pi f)}{\pi f} \exp(j\pi f),$$

where f is the offset frequency in bins (=L+δ) from the desired bin, k. The exp term is caused by the shift of the rectangular time window from a position centered on zero to a position starting at zero (as per the FFT). The slope of this expression is used in the first term of the Taylor expansion to get the ICI value $$\frac{\partial Y(f)}{\partial f} = D_k H_k \left[\left(\frac{\pi\cos(\pi f)}{(\pi f)} - \frac{\pi\sin(\pi f)}{(\pi f)^2}\right)\exp(j\pi f) + j\pi \exp(j\pi f)\frac{\sin(\pi f)}{\pi f}\right]$$

$$ICI_{k+L,k} = \frac{\partial Y(f=L)}{\partial f}\delta$$

$$= D_k H_k \left(\frac{\left(\frac{\pi\cos(\pi L)}{(\pi L)} - \frac{\pi\sin(\pi L)}{(\pi L)^2}\right)}{\exp(j\pi L) + j\pi\exp(j\pi L)\frac{\sin(\pi L)}{\pi L}}\right)\delta$$

$$ICI_{k,k} = D_k H_k j\pi\delta \text{ when } L = 0$$

$$ICI_{k+L,k} \approx D_k H_k \frac{\cos(\pi L)\exp(j\pi L)}{L}\delta$$

$$= D_k H_k \frac{\delta}{L}$$

$$= \frac{ICI_{k,k}}{j\pi L} \text{ when}|L| > 0$$

Note that since the frequency offset from the kth bin is L+δ in the above derivation, and one in practice is observing the output of bin L, the true frequency offset for the signal has a sign that is opposite that of δ.

For frequency offset this gives ICI coefficients, $G_L$, of $$\ldots, \frac{-1}{j3\pi}, \frac{-1}{j2\pi}, \frac{-1}{j\pi}, \frac{1}{j\pi}, \frac{1}{j2\pi}, \frac{1}{j3\pi}, \ldots \text{ for}$$

$$L = \ldots, -3, -2, -1, 1, 2, 3, \ldots$$

change when L goes negative. The self-interference term that occurs (L=0) represents the phase rotation in half a symbol period and is usually included in the channel estimation process.

Figure 7:
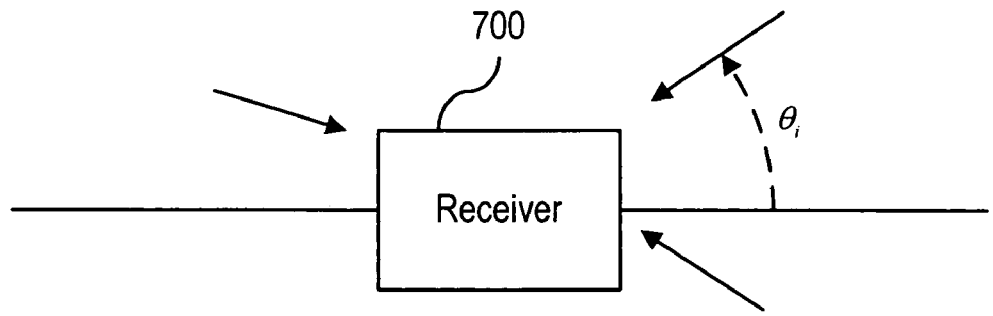
FIG. 7 shows how a receiver can receive different rays of a signal, each with its own Doppler shift depending on the angle of arrival, $\theta_i$, relative to the receiver.

Now consider correction of the ICI in fading conditions. FIG. 7 shows how a receiver 700 can receive different rays of a signal, each with its own Doppler shift depending on the angle of arrival, $\theta_i$, relative to the receiver 700. Each ray has an associated gain ($h_i$), phase ($\phi_i$), delay ($\tau_i$) and normalized Doppler shift (i.e., the actual Doppler frequency divided by the sub-carrier spacing)

$$\left(\delta_i = \frac{f_D}{\Delta f}\cos(\theta_i)\right).$$

The amplitude, phase and delay of each ray is substantially constant (quasi-static) during reception of one symbol. It is the phase rotation generated by the Doppler shift that causes fading in time. The effect of each ray will be summed separately.

$$h(t) = \sum_i h_i(t - \tau_i)\exp\left(j\frac{2\pi\delta_i t}{N} + \phi_i\right)$$

The channel, $H_k(t)$, for frequency bin k slowly changes due to the Doppler phase rotation on each path $$H_k(t) = \sum_i h_i \exp\left(j\frac{2\pi\tau_i k}{N} + \phi_i + \frac{2\pi\delta_i t}{N}\right)$$

After one symbol period, the channel changes to $H_k(t+T_N+T_{cp})$ (i.e., the new channel estimate in the next time slot). The rotation on each path is $2\pi\delta_i(N+cp)/N$.

The effect of Doppler shifting in each path is to generate self-interference in the symbol because it shifts information conveyed in one sub-carrier to another sub-carrier. A phase shift of $\delta_i$ results in an average gain of $\exp(j\pi\delta_i)$. For small $\delta_i$ this can be approximated by $j\pi\delta_i$. (Assuming a pure frequency shift results in a phase change. Taylor expansion o the exponential gives the result.) The effect of this on all paths is to change the channel to $$H_k\left(t + \frac{T_N}{2}\right).$$

Figure 8:
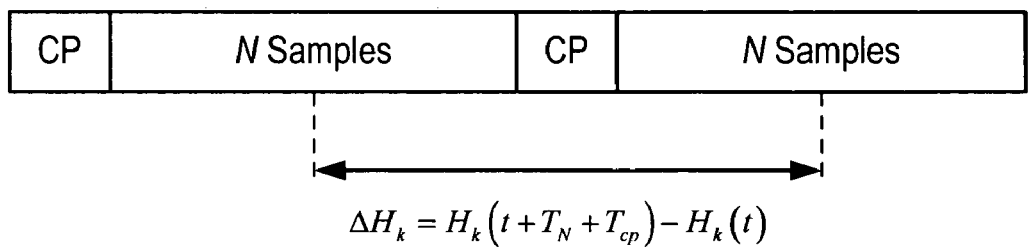
FIG. 8 illustrates how a difference in successively determined channel estimates is preferably measured from mid-symbol to mid-symbol in some embodiments.

If we assume a linear response between channel measurements:

$$H_k(t + T_N/2) = H_k(t) + \left[\frac{(H_k(t+T_N+T_{cp}) - H_k(t))}{(T_N + T_{cp})}\right]\frac{T_N}{2}$$

where the difference $\Delta H_k = H_k(t+T_N+T_{cp}) - H_k(t)$, which appears in the numerator on the right-hand side of the equation, is preferably measured from mid-symbol to mid-symbol as illustrated in FIG. 8.

The last term, corresponding to the channel change during the OFDM symbol divided by two, is one of the factors that appears in the self-interference term, which can be written $$ICI_{k,k} = D_k(t)\left[\frac{(H_k(t+T_N+T_{cp}) - H_k(t))}{(T_N + T_{cp})}\right]\frac{T_N}{2}$$

A better estimate is obtained if the difference is taken over two symbol periods which are symmetric around the symbol for which the channel change is to be estimated $$ICI_{k,k} = D_k(t)\left[\frac{(H_k(t+T_N+T_{cp}) - H_k(t-T_N-T_{cp}))}{2(T_N + T_{cp})}\right]\frac{T_N}{2}$$

In practice, as already stated, neither the transmitted symbol, $D_k(t)$, nor the channel are known but need to be estimated. This leads to the possibility of estimating the self-interference as, for example,:

$$ICI_{k,k} = \frac{R_k(t)}{\hat{H}_k(t)}\left[\frac{(\hat{H}_k(t+T_N+T_{cp}) - \hat{H}_k(t-T_N-T_{cp}))}{2(T_N + T_{cp})}\right]\frac{T_N}{2}$$

As stated before, there are a number of ways to estimate both the sent data and the channel variation, and the above should be considered merely one of many possible alternative approaches, all of which are within the scope of the invention.

Now, comparing the above with the case in which the channel variation is due to a frequency error, $-\delta$, it follows that $$ICI_{k-L,k} = \frac{ICI_{k,k}}{j\pi L} = ICI_{k,k} G_L$$

This is subtracted from bin k−L to complete the cancellation process. More generally, the coefficient term $G_L$ depends on the window used.

Receiver windowing also reduces ICI, so in some embodiments a suitable window is selected prior to determination of the coefficients $G_L$ since, as mentioned above, the coefficients are determined as a function of the type of window being used.

Figure 9:
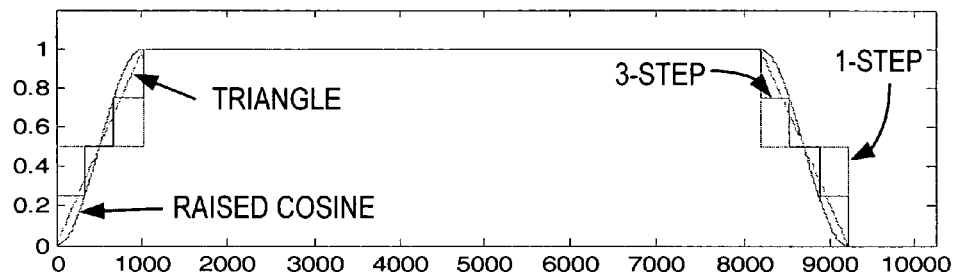
FIG. 9 illustrates a number of window functions that might be considered for use in OFDM receivers of the type described herein.

FIG. 9 illustrates a number of window functions that might be considered for use in OFDM receivers of the type described herein. In general, the size of the window is given by WindowSize=$(1+W_{REL})N=(1+cp\cdot win)N$ where $W_{REL}$ is the size of the window roll-off region, which is here expressed as a fraction, win, of the size of the cyclic prefix (which itself is expressed relative to the size of the symbol, N).

In each of the examples, it is assumed that the symbol size N=8192, that the size of the cyclic prefix is 0.25·N (i.e., the size of the cyclic prefix relative to the size of the symbol is given by cp=0.25), and that the size of the window roll-off region is 0.5·cp·N (i.e., the window roll-off region is one-half the size of the cyclic prefix.) The numbers shown here are merely examples, however, and are not intended to limit the scope of the invention in any way. In particular, the following windows are shown in FIG. 9:

Triangle window: The window begins over an initial period of time by increasing linearly from its minimum value of zero to its maximum value, remains at its maximum value for a time, and then decreases linearly back to zero. This type of window was used as an example in FIG. 5.

Raised cosine: The window begins over an initial period of time by increasing from its minimum value of zero to its maximum value in accordance with a raised cosine function, remains at its maximum value for a time, and then decreases from its maximum value back to zero in accordance with a raised cosine function.

1-step: The window begins with a step function that increases from a minimum value of zero to an intermediate value, stays at the intermediate value over a first period of time, then with another step function increases from the intermediate value to a maximum value, remains at the maximum value for a second period of time, then with a step function decreases from the maximum value to the intermediate value, remains at the intermediate value for a third period of time, and then with a step function decreases from the intermediate value back to zero.

3-step: The window begins with a step function that increases from a minimum value of zero to a first intermediate value, stays at the first intermediate value over a first period of time, then increases from the first intermediate value to a second intermediate value, stays at the second intermediate value over a second period of time, then increases from the second intermediate value to a third intermediate value, stays at the third intermediate value over a third period of time, then with another step function increases from the third intermediate value to a maximum value, remains at the maximum value for a fourth period of time, then with a step function decreases from the maximum value to the third intermediate value, remains at the third intermediate value for a fifth period of time, then with a step function decreases from the third intermediate value to the second intermediate value, remains at the second intermediate value for a sixth period of time, then with a step function decreases from the second intermediate value to the first intermediate value, remains at the first intermediate value for a seventh period of time, and then with a step function decreases from the first intermediate value back to zero.

The invention is not limited to these examples, however; many other window functions not illustrated here may also be used.

Figure 10:
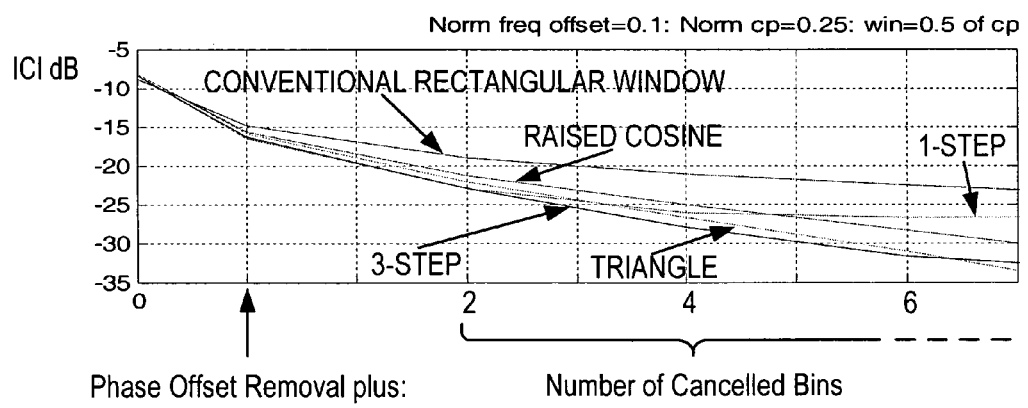
FIG. 10 is a graph showing the results of simulations of the effectiveness of canceling and windowing for different window functions.

FIG. 10 is a graph showing the results of simulations of the effectiveness of canceling and windowing for different window functions. In this example, the ICI is caused by frequency offset rather than Doppler shift of the channel. As noted earlier, frequency error can be seen as a special case of Doppler shift, in which the channel change means that the phase is changed during an OFDM symbol. In FIG. 10, the ICI power, for a normalized frequency offset of $\delta=0.1$, is plotted against the number of cancelled bins for each of a number of different window functions. The horizontal axis depicts the number of cancelled bins, with bin 0 representing no cancellation, a first point representing removal of only the fixed phase offset, a point "2" showing the effect of removing the fixed phase offset plus cancellation of the 2 adjacent bins, a point "4" showing the effect of removing the fixed phase offset plus cancellation of the 4 adjacent bins, and so on.

For these simulations, the window size is fixed at $W_{REL}=\frac{1}{8}$th of the symbol period (i.e., half the cyclic prefix length when the CP is ¼ of the symbol period). The top curve shows the effect of using a conventional rectangular window function. The lower the curve, the better the performance. It can be seen from the various graphs that selecting a "best" window function for a given OFDM receiver is dependent on the number of bins that will be cancelled in that receiver. The smoother windows perform better when the number of cancelled bins is large. The triangle is best above a point 6 (i.e., removal of the fixed phase offset plus the 6 adjacent bins). The 3-step is best for removal of the fixed phase offset plus from 2 to 6 adjacent bins of cancellation and the 1-step is marginally better for the case of no ICI cancellation at all—just removal of the fixed phase offset.

Another consideration when designing an OFDM receiver is complexity. In this respect, it is noted that the stepped waveforms involve no multiplications, just shift operations, and are therefore simple. Thus, the 3-step window function can be considered preferable when ICI is contemplated.

All windows will give a slight improvement in Signal-to-Noise Ratio (SNR) performance. The 1-step is the best giving a $(1-W_{REL}/2)$ noise reduction (0.28 dB in the example of FIG. 10). In these examples, $W_{REL}$ (i.e., the size of the window roll-off region relative to the size of the symbol) is 1024/8192.

The results depicted in FIG. 10 also demonstrate that it can be advantageous to select a shape of the window function based on a length of the window function, and some alternative embodiments include this aspect.

Figure 11:
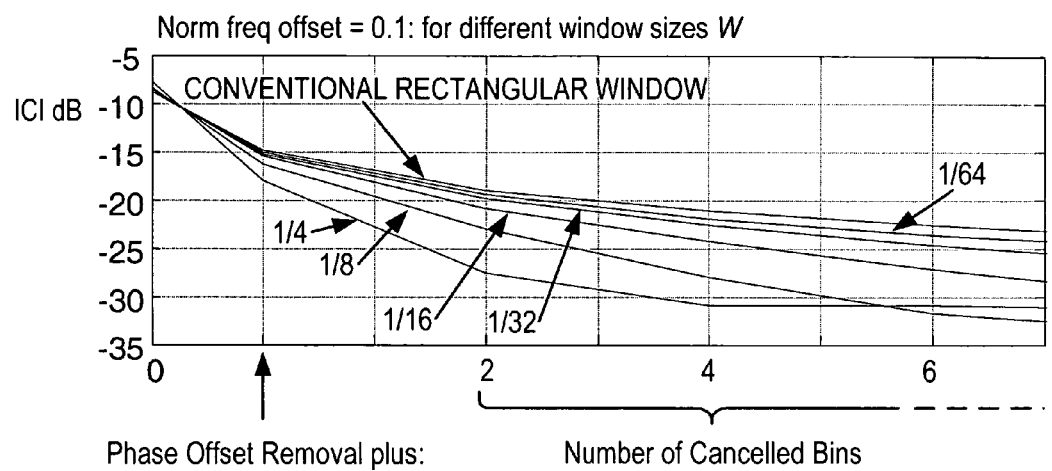
FIG. 11 is a set of graphs showing the effect of changing the size of the window function.

FIG. 11 is a set of graphs showing the effect of changing the size of the window function. In particular, the graphs show ICI (in dB) plotted as a function of the number of cancelled bins for a preferred window function (3-step) using up different amounts of the cyclic prefix: 100% ($W_{REL}=\frac{1}{4}$), 50% ($W_{REL}=\frac{1}{8}$), 25% ($W_{REL}=\frac{1}{16}$), 12.5% ($W_{REL}=\frac{1}{32}$), and 6.25% ($W_{REL}=\frac{1}{64}$). (The cyclic prefix is assumed to be 25% of the symbol period in this case). As with FIG. 10, the horizontal axis depicts the number of cancelled bins, with point 0 representing no cancellation, a first point representing removal of only the fixed phase offset, a point "2" showing the effect of removing the fixed phase offset plus the 2 adjacent bins, a point "4" showing the effect of removing the fixed phase offset plus the 4 adjacent bins, and so on. For reference, the uppermost graph representing $W_{REL}=0$ (i.e., use of a conventional rectangular window function) is also shown. Removal of only the fixed phase offset occurs as a result of the typical channel estimation process. The $W_{REL}=\frac{1}{8}$ window reduces the remaining ICI by 1.5 dB, from −15 dB to −16.5 dB. The improvement increases as the number of cancelled bins are increased. (4 dB for removal of the fixed phase offset plus cancellation of 2 adjacent bins and 7 dB for removal of the fixed phase offset plus cancellation of 4 adjacent bins and 9 dB for removal of the fixed phase offset plus cancellation of the 6 adjacent bins). For a given number of cancelled bins, the improvement generally increases also as the window size is made larger. Although the graph shows the most improvement in ICI cancellation being achieved when the window function uses up the entire cyclic prefix (i.e., $W_{REL}=\frac{1}{4}$), this is not recommended since selected samples would include energy from a previously transmitted symbol (due to time dispersion of the channel), and therefore cause inter-symbol interference.

As mentioned earlier, the shape of the window function determines the values of the canceling coefficients, $G_L$, that are used by the ICI subtraction logic 409. Preferably, these coefficients can be determined beforehand and stored in a lookup table. The following is an example that well-illustrates the principles involved in determining the canceling coefficients for a given window function. In this example, a 3-step window function is assumed.

Figure 12:
FIG. 12 illustrates how, for purposes of determining ICI canceling coefficients, the 3-step window function can be considered as the sum of 4 rectangular pulses, each time shifted.

The 3-step window function can be considered as the sum of four rectangular pulses, each time shifted with respect to the others. This is illustrated in FIG. 12. The value $W_{REL}$, is here expressed relative to the FFT symbol size, which is shown being normalized to a value of 1.0. To avoid complex coefficients the wrap that is performed after the window function is applied (i.e., to generate combined weighted samples) should be between the dotted lines shown in the figure.

The experienced interference, Y(L), is therefore the sum of the interference associated with each of the rectangular pulses, and is given by:

$$Y(f) = D_k H_k \frac{\sin(\pi f)}{\pi f} \exp(j\pi f)$$

$$\left( \frac{\exp(j\pi f W_{REL}) + \exp\left(j\pi f \frac{W_{REL}}{3}\right) + \exp\left(-j\pi f \frac{W_{REL}}{3}\right) + \exp(-j\pi f W_{REL})}{4} \right)$$

$$= D_k H_k \frac{\sin(\pi f)}{\pi f} \exp(j\pi f) \frac{(\cos(\pi f W_{REL}) + \cos(\pi f W_{REL}/3))}{2}$$

By similar reasoning as for the case when a rectangular window is used (i.e., by using Taylor expansion), the following expression is obtained for the ICI:

$$ICI_{k-L,k} = G_L ICI_{k,k}$$

but where now the coefficient $G_L$ has been reduced from $1/(j\pi L)$ to $$G_L = \frac{\cos(\pi L W_{REL}) + \cos\left(\pi L \frac{W_{REL}}{3}\right)}{2j\pi L}$$

These coefficients are shown in a table presented in FIG. 13.

The technique for generating canceling coefficients for other window shapes will now be readily apparent to those of ordinary skill in the art, since any of the shapes can be considered equivalent to a sum of time-displaced rectangular pulses.

Figure 14:
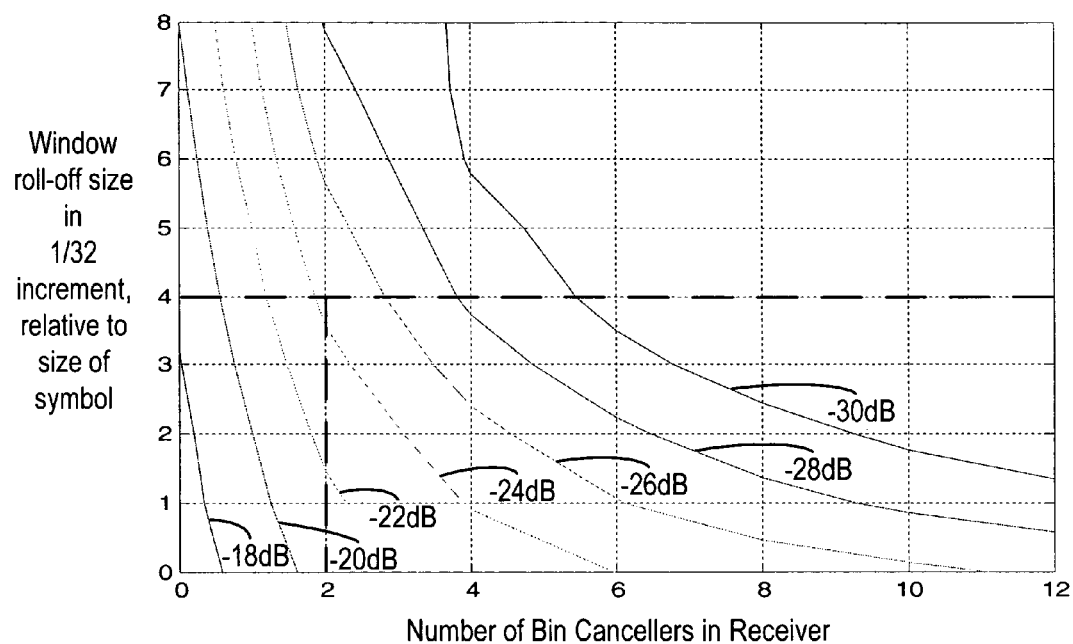
FIG. 14 is a set of graphs showing, for a given amount of ICI cancellation, what combinations of window function size (3-step window function assumed) and number of bins cancelled will achieve that level of cancellation.

The combined effect of windowing and canceling is shown in FIG. 14, which is a set of graphs showing, for a given amount of ICI cancellation, what combinations of window function size (3-step window function assumed) and number of bins cancelled will achieve that level of cancellation. Window function sizes are shown ranging from 0 (i.e., conventional rectangular window function) to 8/32 (i.e., full cyclic prefix size when the length of the cyclic prefix is equal to 0.25 the length of the symbol). These values assume a 16-path omni-directional (Jakes-like) channel, with a maximum normalized Doppler frequency, $f_D$, equal to $f_D$=0.12. These graphs show that window size can be traded off for canceling complexity, ICI reduction or Doppler performance. Increasing the window size from $W_{REL}$=0 to $W_{REL}$=4/32, reduces the ICI from –18.5 dB to –24 dB for a 2 bin canceller (L=+1,L=–1).

The information presented in FIG. 14 provides a basis for a set of alternative embodiments in which ICI cancellation is selectively applied based on what SNR is required for the system to work properly and an estimate of the experienced Doppler frequency. For example, if the required SNR is 10 dB, it is known that an ICI level as high as –10 dB will be acceptable. Since, in the example of FIG. 14, it is known that this level of performance can be achieved without ICI cancellation, the ICI cancellation is turned off. If instead, 20 dB is required, then ICI cancellation is turned on to satisfy the receiver's requirements. (This figure is for a fixed $f_D$.) Since the amplitude of the ICI is proportional to the derivative of the channel, practical embodiments can compare the estimated ICI level with the required SNR to dynamically determine whether ICI cancellation should be performed.

Adaptively changing the window size to utilize the available ISI-free section of the cyclic prefix can lead to a greatly improved performance in Doppler channels, when the delay spread of the channel is low.

Rather than deriving the coefficients for a fading channel by considering it as a superposition of many paths corresponding to different frequency errors, one might also (directly) assume that the channel is varying in a linear fashion and derive the coefficients for the sampled signal at the output of the FFT. Specifically, let $$H_{K,n} = \overline{H}_K + \left(n - \frac{N-1}{2}\right) \frac{H'_K}{N}, \tag{1}$$

where $H_K'$ is the channel change during the (information part of the) symbol for carrier K, and n is the time index going from 0 to N–1. Note that in this case, the average channel during the reception of the OFDM symbol equals $\overline{H}_K$. Considering the K+Lth bin at the output of the FFT, this equals $$ICI_{K+L} = \sum_{n=0}^{N-1} r_n e^{-j\frac{2\pi}{N}(K+L)n} \tag{2}$$

$$= \sum_{n=0}^{N-1} \frac{1}{N} \sum_{k=0}^{N-1} D_k H_{k,n} e^{j\frac{2\pi}{N}(k-K-L)n}$$

$$= \sum_{k=0}^{N-1} D_k \sum_{n=0}^{N-1} \frac{1}{N} H_{k,n} e^{j\frac{2\pi}{N}(k-K-L)n},$$

where $r_n$ denotes the nth sample of the received signal. Note that $ICI_{K+L}$ is the total signal on bin K+L.

In case the channel is static (i.e., $H_{k,n}=H_k$ for all n), then $$ICI_{K+L} = \sum_{k=0}^{N-1} D_k H_k \sum_{n=0}^{N-1} \frac{1}{N} e^{j2\pi(k-K-L)n/N} \tag{3}$$

$$= D_{K+L} H_{K+L}.$$

That is, if the channel is not varying then there is no leakage in the FFT.

To determine the effect of a varying channel, once again let $ICI_{k+L,k}$ denote the ICI that is experienced on bin k+L due to the signal transmitted on bin k. Then we have $$ICI_{k+L,k} = D_k \frac{1}{N} \sum_{n=0}^{N-1} H_{k,n} e^{-j\frac{2\pi}{N}nL} \tag{4}$$

$$= D_k H'_k \frac{1}{N} \sum_{n=0}^{N-1} \frac{n}{N} e^{-j\frac{2\pi}{N}nL},$$

where the last step follows from the fact that the different tones are orthogonal if the channel is static, so it is only the varying part that contributes to the ICI. To proceed, we use the fact that if N becomes large, then $$\sum_{n=0}^{N-1} \frac{n}{N} e^{-j\frac{2\pi}{N}nL} \frac{1}{N} \approx \int_0^1 t e^{j2\pi tL} dt = \frac{-1}{j2\pi L}. \quad (5)$$

Consequently, the ICI on carrier k+L caused by the symbol sent on carrier k is given by $$ICI_{k+L,k} \approx D_k H'_k - \frac{1}{j2\pi L}. \quad (6)$$

Alternatively, by replacing L by −L, we obtain $$ICI_{k-L,k} \approx D_k H'_k \frac{1}{j2\pi L}. \quad (7)$$

Defining the self-interference as $D_k H'_k/2$, it follows that the same result is obtained as when the ICI terms were derived from assuming the channel being a superposition of frequency offsets.

The gain that can be obtained by using a non-rectangular window can also be derived using the sampled signal at the output of the FFT. Before considering a specific window, suppose that $r_{N-W}, r_{N-W+1}, \ldots, r_{N-1}$ are replaced by $r_{-W}, r_{-W+1}, \ldots, r_{-1}$, before applying the FFT. We say that "folding" takes place around sample zero since $r_0$ is the first sample fed to the FFT. The ICI can then be calculated as $$ICI_{k-L,k} = S_k H'_k \frac{1}{N^2} \left( \sum_{n=0}^{N-1-W} n e^{j\frac{2\pi}{N}nL} + \sum_{n=N-W}^{N-1} (n-N) e^{j\frac{2\pi}{N}nL} \right). \quad (8)$$

Straight-forward calculation then gives $$ICI_{k-L,k} = S_k H'_k \frac{e^{-j\frac{2\pi}{N}WL}}{j2\pi L}. \quad (9)$$

To exemplify what happens in case the window is not symmetric with respect to folding, as was the case in FIG. 5, consider using a window function where W samples from the GI are combined with the corresponding part at the end of the OFDM symbol by multiplying each of the corresponding samples by 0.5 and then adding them together. This window can be expressed as:

$$w(n) = \begin{cases} 0.5 : & -W \leq n \leq -1 \\ 1.0 : & 0 \leq n \leq N-1-W \\ 0.5 : & N-W \leq n \leq N-1. \end{cases} \quad (10)$$

Since this can be viewed as an average of Eqns. (6) and (9), we obtain $$ICI_{k+L,k} = S_k H'_k \frac{-1}{j2\pi L} \frac{1 + e^{-j\frac{2\pi}{N}WL}}{2} \quad (11)$$

$$= S_{k+L} H'_{k+L} \frac{-e^{-j\frac{\pi}{N}WL}}{j2\pi L} \cos\left(\frac{\pi}{N}WL\right).$$

The factor $$e^{-j\frac{\pi}{N}WL}$$

is merely a phase shift caused by how the folding is done. This phase shift can be avoided by having a symmetric window with respect to the FFT position, that is, by having a symmetric window as in the previous example with a three step window. Finally, to further emphasize the similarity with the previous derivation of the effect of using a non-rectangular window, note that $W_{REL}=W/N$.

Comparing Eqns. (6) and (11), it is readily seen that the simple window above reduces the magnitude of the ICI by a factor of $$\cos\left(\frac{\pi}{N}WL\right).$$

In Table 1, the effect of using the simple window above is given for various values of the normalized window length $W_{REL}$ and number of canceled bins. Here, canceling two bins means that ICI from the two closest bins (one on each side, i.e., L=±1) are cancelled, canceling four bins means that ICI from the four closest bins (two on each side, i.e., L=±1,±2) are cancelled, and so on.

TABLE 1

Ideal improvement in dB by using different combinations of Window lengths and different complexity in the ICI cancellation.

|  | No canceling | 2 bins | 4 bins | 6 bins |
| --- | --- | --- | --- | --- |
| $W_{REL} = 0$ | 0 dB | 4.07 | 6.20 | 7.64 |
| $W_{REL} = 1/16$ | 0.84 | 6.21 | 9.61 | 12.03 |
| $W_{REL} = 1/8$ | 1.73 | 8.16 | 11.15 | 11.74 |
| $W_{REL} = 3/16$ | 2.65 | 9.12 | 9.99 | 10.10 |
| $W_{REL} = 1/4$ | 3.59 | 8.75 | 8.75 | 10.02 |

Since the ICI is proportional to $f_D^2$, it follows from Table 1 that, for example, in case of $W_{REL}=3/16$ and no canceling, it is ideally possible to increase the maximum tolerable Doppler shift by about 35%, and if the intercarrier interference from the two closest carriers (i.e., L=±1) were perfectly canceled, then the maximum tolerable Doppler would ideally be improved by almost a factor of three.

For an arbitrary Nyquist window of length N+W, there are W samples from the GI that are combined with the corresponding samples at the end of the OFDM symbol. The weights of the window function might be chosen independently for each sample, the only requirement being that w(−n)+w(N−n)=1 in order to fulfill the Nyquist criterion. Since the ICI coefficients will depend on the shape of the window function, this should be chosen in combination with how many bins are to be canceled. Referring to Table 1, it can be seen that different window lengths are optimum for different numbers of canceled bins (assuming the same window shape).

Returning to a consideration of the block diagram illustrated in FIG. 4, it will be understood that this exemplary OFDM receiver utilizes both windowing, and ICI cancellation. The received signal is first supplied to window and wrap logic 401, which performs various window operations as described above. The N samples generated by the window and wrap logic 401 are supplied to the FFT unit 203 which generates the transmitted data from the modulated signal. The channel estimator 205 generates an estimate of the channel, and supplies this to ICI subtraction logic 409 and to an equalizer 207. The ICI subtraction logic 409 uses the channel estimate to generate an estimate of the ICI and to then subtract this ICI estimate from the data supplied by the FFT unit 203. It will be noted that the coefficients, $G_L$, used by the ICI subtraction logic 409 are themselves a function of the window function being used by the window and wrap logic 401. The output of the ICI subtraction logic 409 is then supplied to the equalizer 207 for further processing.

As mentioned earlier, in an actual implementation the channel variation needs to be estimated. In addition, the sent data must be estimated, unless it happens to be a pilot symbol, in which case it is known. To see the impact of different ways of estimating the data, two approaches were compared. In the first, the data was simply estimated as $$\hat{D}_K = R_K / \hat{H}_K. \quad (12)$$

In the second, a decision directed approach was used in which one first uses Eqn. (12), and then makes a decision.

Simulations were performed to test the above-described techniques for a DVB-T system with an 8k FFT. Typically, the existence of high Doppler shifts implies that channel estimation will be more difficult, especially in case interpolation in time is used. To reduce the impact of poor channel estimation at high Doppler shifts, a channel with a relatively short excess delay (1 µs) was used in the simulations. This allows for channel estimation to be done by directly interpolating between the pilot symbols in the frequency direction.

A simple cubic interpolation filter was used in the simulations. It should therefore be possible to achieve further improved performance by using more complicated interpolation filters. Nevertheless, this simple filter suffices to give some indication of how different parameters related to ICI cancellation affect the performance. Two figures of merit were used to determine the performance without having to simulate the complete system including FEC. These were:

Symbol error rate (SER) prior to the FEC decoding. That is, the SER is determined based on the equalized data in the IQ-diagram.

The SNR in the IQ diagram, where the error is weighted by $|\hat{H}_K|$ in order to compensate for the received signal being divided by $\hat{H}_K$ when equalizing the channel.

The simulations were done for various Doppler shifts, and each point in the figures was obtained by simulating 1000 OFDM symbols, each containing some 6000 data sub-carriers. The following aspects were studied:

The impact of using a window as the one described by Eqn. (10) of size $W_{REL} = 3/16$.

The impact of using a decision directed approach, as described above.

The impact of the number of canceled bins. Here only three cases were compared: No cancellation, canceling the two closest bins, and canceling four bins.

Figure 15:
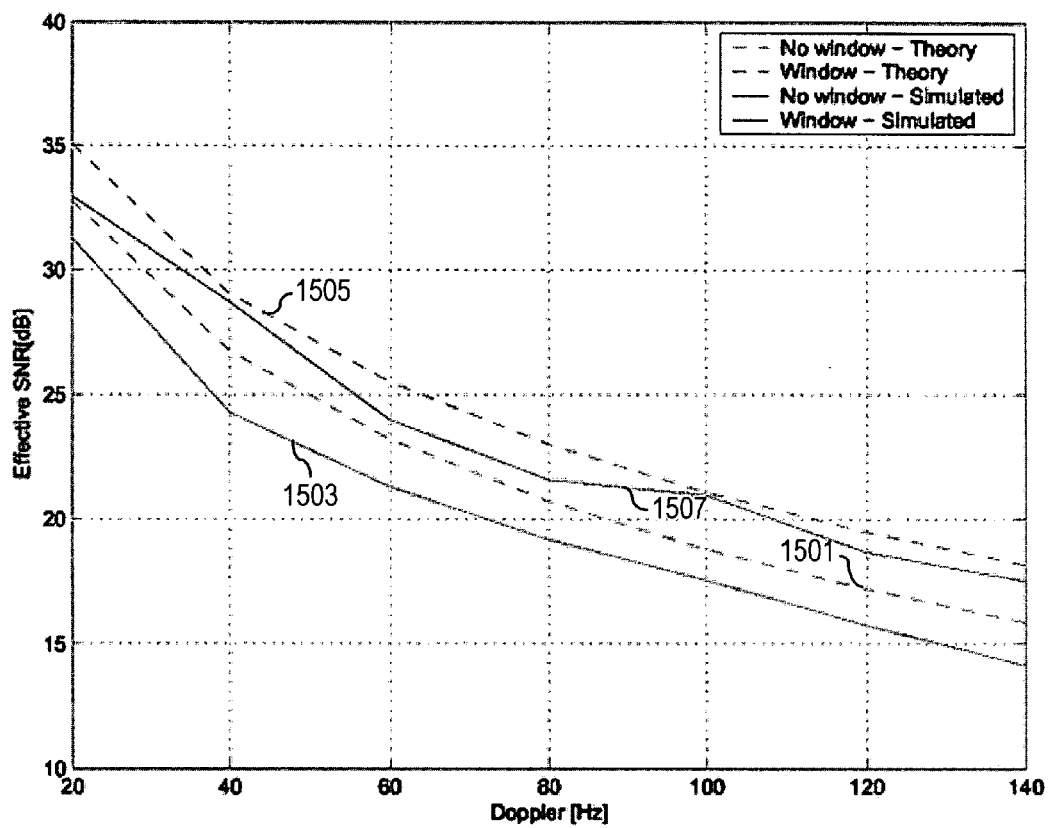
FIG. 15 is a set of graphs showing a comparison between simulated effective SNR and theoretical effective SNR for the case of perfect channel estimation and C/N=100 dB.

FIG. 15 is a set of graphs showing a comparison between simulated effective SNR and theoretical effective SNR for the case of perfect channel estimation. For these simulations, the Carrier-to-Noise ratio (C/N) is equal to 100 dB. Graph 1501 shows theoretical performance for the case of no windowing applied. Graph 1503 shows the results of simulated performance for the case of no windowing applied. Graph 1505 shows theoretical performance for the case of windowing being applied. Graph 1507 shows the results of simulated performance for the case of windowing being applied.

Figure 16:
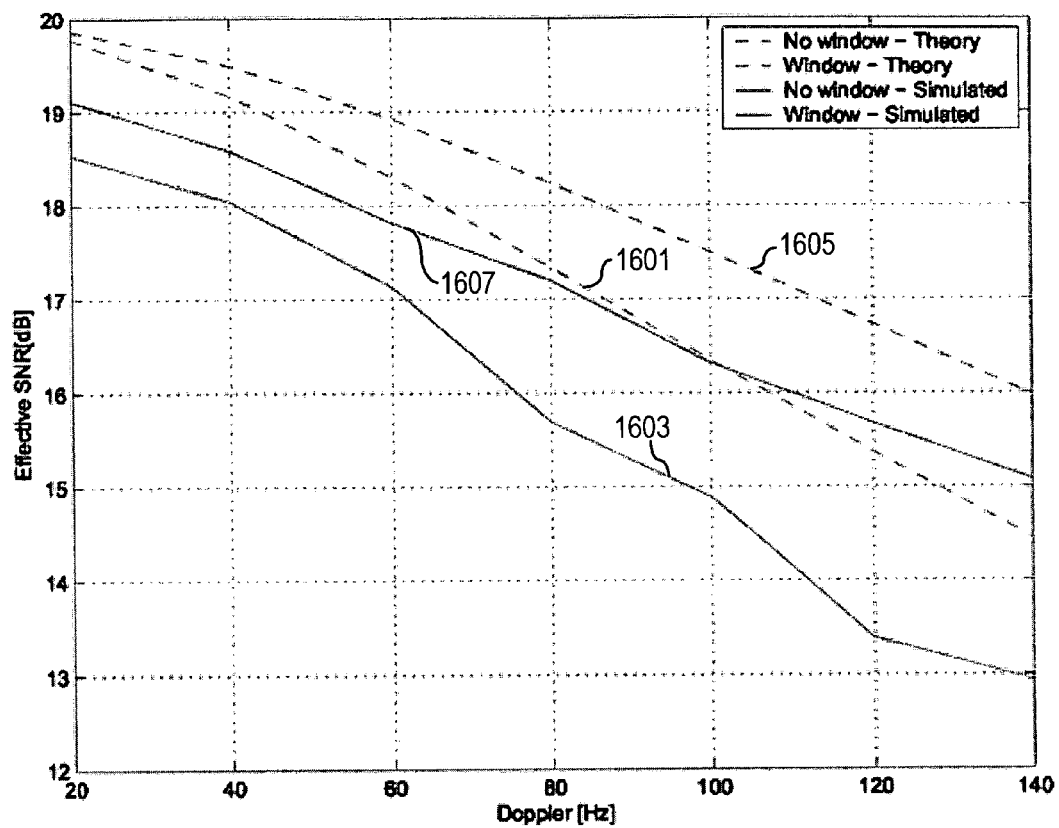
FIG. 16 is a set of graphs showing a comparison between simulated effective SNR and theoretical effective SNR for the case of perfect channel estimation and C/N=20 dB.

FIG. 16 is a set of graphs showing a comparison between simulated effective SNR and theoretical effective SNR for the case of perfect channel estimation. For these simulations, C/N=20 dB. Graph 1601 shows theoretical performance for the case of no windowing applied. Graph 1603 shows the results of simulated performance for the case of no windowing applied. Graph 1605 shows theoretical performance for the case of windowing being applied. Graph 1607 shows the results of simulated performance for the case of windowing being applied.

Figure 17:
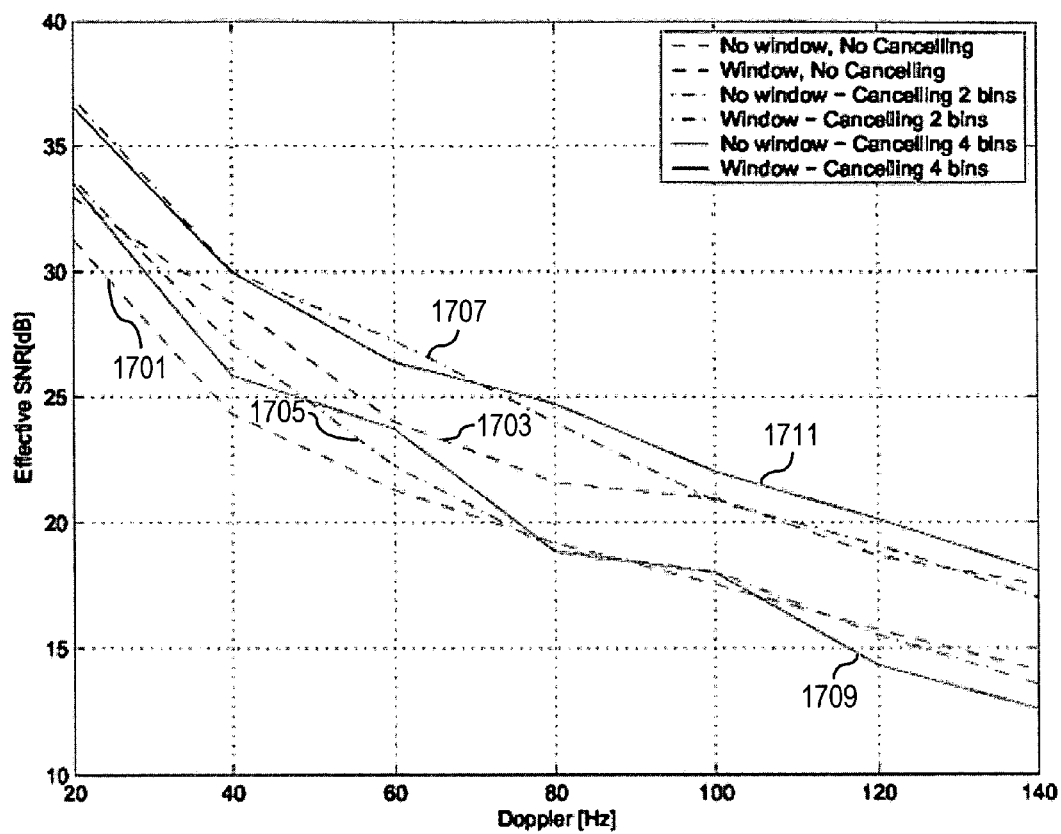
FIG. 17 is a set of graphs showing a comparison simulated performance for ICI cancellation of 2 and 4 bins, with the sent signal estimated as $\hat{S}_K = R_K/\hat{H}_K$ when SNR=100 dB.

FIG. 17 is a set of graphs showing a comparison simulated performance for ICI cancellation of 2 and 4 bins, with the sent signal estimated as $\hat{S}_K = R_K / \hat{H}_K$ when SNR=100 dB. Graph 1701 shows performance when no windowing and no ICI canceling is performed. Graph 1703 shows performance when windowing is performed but no ICI canceling is performed. Graph 1705 is a graph showing performance when no windowing is performed but ICI cancellation of 2 bins is performed. Graph 1707 is a graph showing performance when windowing is performed and ICI cancellation of 2 bins is performed. Graph 1709 is a graph showing performance when no windowing is performed but ICI cancellation of 4 bins is performed. Graph 1711 is a graph showing performance when windowing is performed and ICI cancellation of 4 bins is performed.

Figure 18:
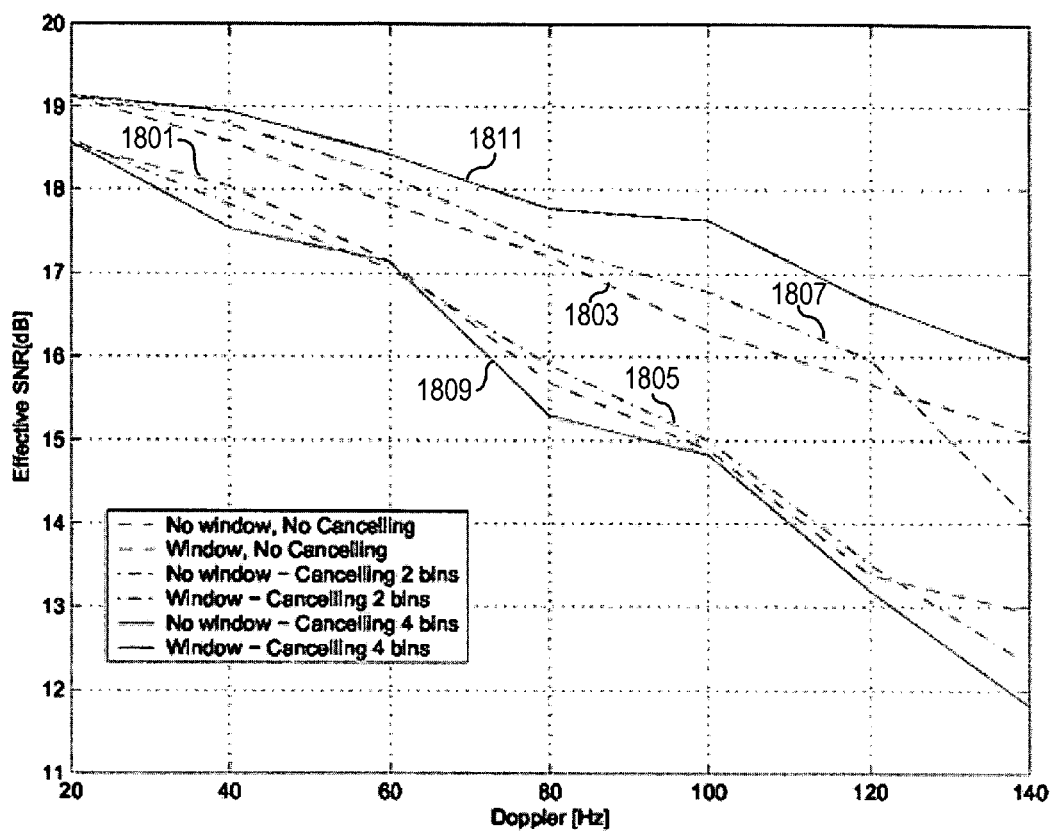
FIG. 18 is a set of graphs showing a comparison simulated performance for ICI cancellation of 2 and 4 bins, with the sent signal estimated as $\hat{S}_K = R_K/\hat{H}_K$ when SNR=20 dB.

FIG. 18 is a set of graphs showing a comparison simulated performance for ICI cancellation of 2 and 4 bins, with the sent signal estimated as $\hat{S}_K = R_K / \hat{H}_K$ when SNR=20 dB. Graph 1801 shows performance when no windowing and no ICI canceling is performed. Graph 1803 shows performance when windowing is performed but no ICI canceling is performed. Graph 1805 is a graph showing performance when no windowing is performed but ICI cancellation of 2 bins is performed. Graph 1807 is a graph showing performance when windowing is performed and ICI cancellation of 2 bins is performed. Graph 1809 is a graph showing performance when no windowing is performed but ICI cancellation of 4 bins is performed. Graph 1811 is a graph showing performance when windowing is performed and ICI cancellation of 4 bins is performed.

Figure 19:
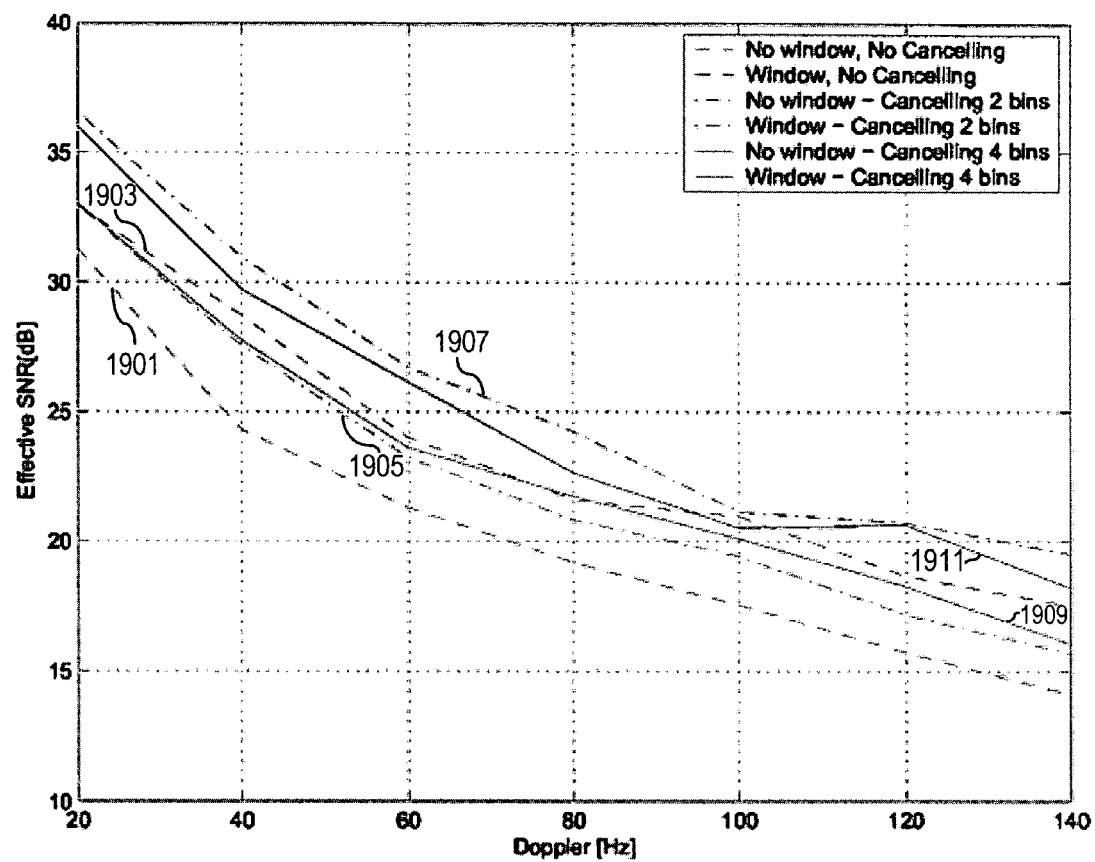
FIG. 19 is a set of graphs showing a comparison simulated performance for ICI cancellation of 2 and 4 bins, with decision directed estimation of the sent signal when SNR=100 dB.

FIG. 19 is a set of graphs showing a comparison simulated performance for ICI cancellation of 2 and 4 bins, with decision directed estimation of the sent signal when SNR=100 dB. Graph 1901 shows performance when no windowing and no ICI canceling is performed. Graph 1903 shows performance when windowing is performed but no ICI canceling is performed. Graph 1905 is a graph showing performance when no windowing is performed but ICI cancellation of 2 bins is performed. Graph 1907 is a graph showing performance when windowing is performed and ICI cancellation of 2 bins is performed. Graph 1909 is a graph showing performance when no windowing is performed but ICI cancellation of 4 bins is performed. Graph 1911 is a graph showing performance when windowing is performed and ICI cancellation of 4 bins is performed.

Figure 20:
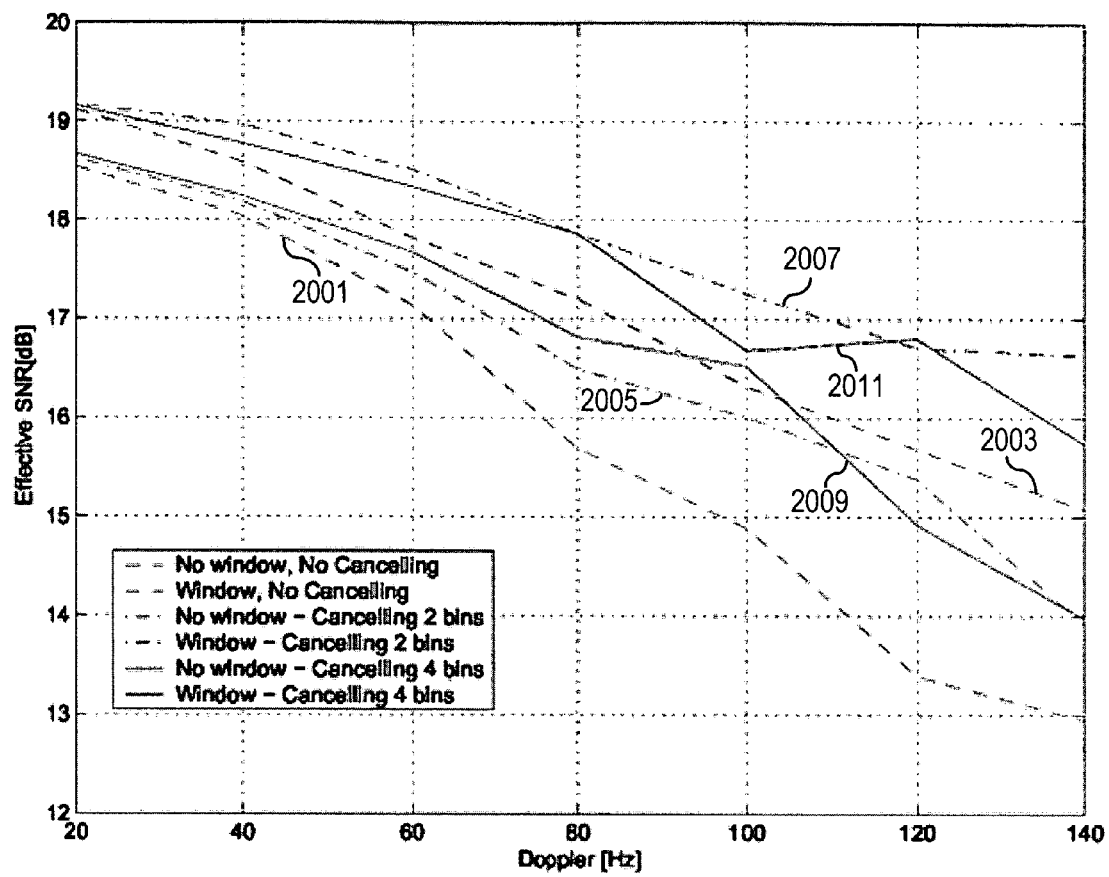
FIG. 20 is a set of graphs showing a comparison simulated performance for ICI cancellation of 2 and 4 bins, with decision directed estimation of the sent signal when SNR=20 dB.

FIG. 20 is a set of graphs showing a comparison simulated performance for ICI cancellation of 2 and 4 bins, with decision directed estimation of the sent signal when SNR=20 dB. Graph 2001 shows performance when no windowing and no ICI canceling is performed. Graph 2003 shows performance when windowing is performed but no ICI canceling is performed. Graph 2005 is a graph showing performance when no windowing is performed but ICI cancellation of 2 bins is performed. Graph 2007 is a graph showing performance when windowing is performed and ICI cancellation of 2 bins is performed. Graph 2009 is a graph showing performance when no windowing is performed but ICI cancellation of 4 bins is performed. Graph 2011 is a graph showing performance when windowing is performed and ICI cancellation of 4 bins is performed.

Figure 21:
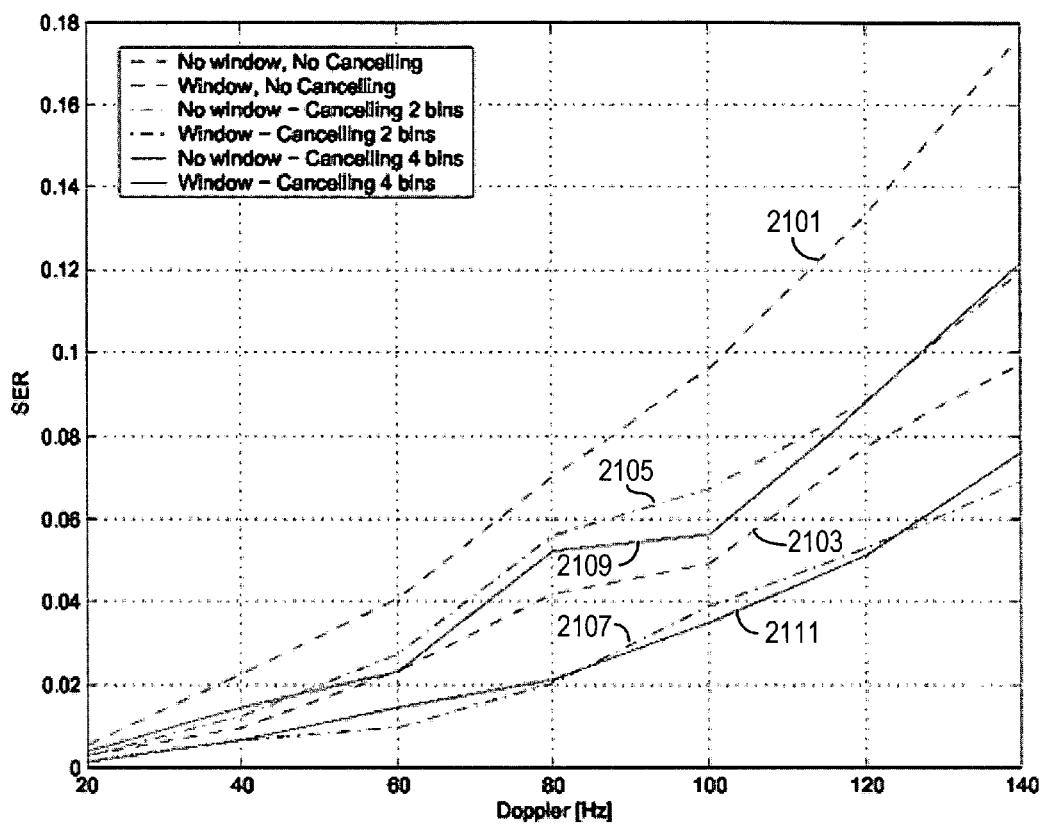
FIG. 21 is a set of graphs showing a comparison simulated Symbol Error Rate (SER) for ICI cancellation of 2 and 4 bins, with the sent signal estimated as $\hat{S}_K = R_K/\hat{H}_K$ when SNR=100 dB.

FIG. 21 is a set of graphs showing a comparison of simulated Symbol Error Rate (SER) for ICI cancellation of 2 and 4 bins, with the sent signal estimated as $\hat{S}_K = R_K/\hat{H}_K$ when SNR=100 dB. Graph 2101 shows performance when no windowing and no ICI canceling is performed. Graph 2103 shows performance when windowing is performed but no ICI canceling is performed. Graph 2105 is a graph showing performance when no windowing is performed but ICI cancellation of 2 bins is performed. Graph 2107 is a graph showing performance when windowing is performed and ICI cancellation of 2 bins is performed. Graph 2109 is a graph showing performance when no windowing is performed but ICI cancellation of 4 bins is performed. Graph 2111 is a graph showing performance when windowing is performed and ICI cancellation of 4 bins is performed.

Figure 22:
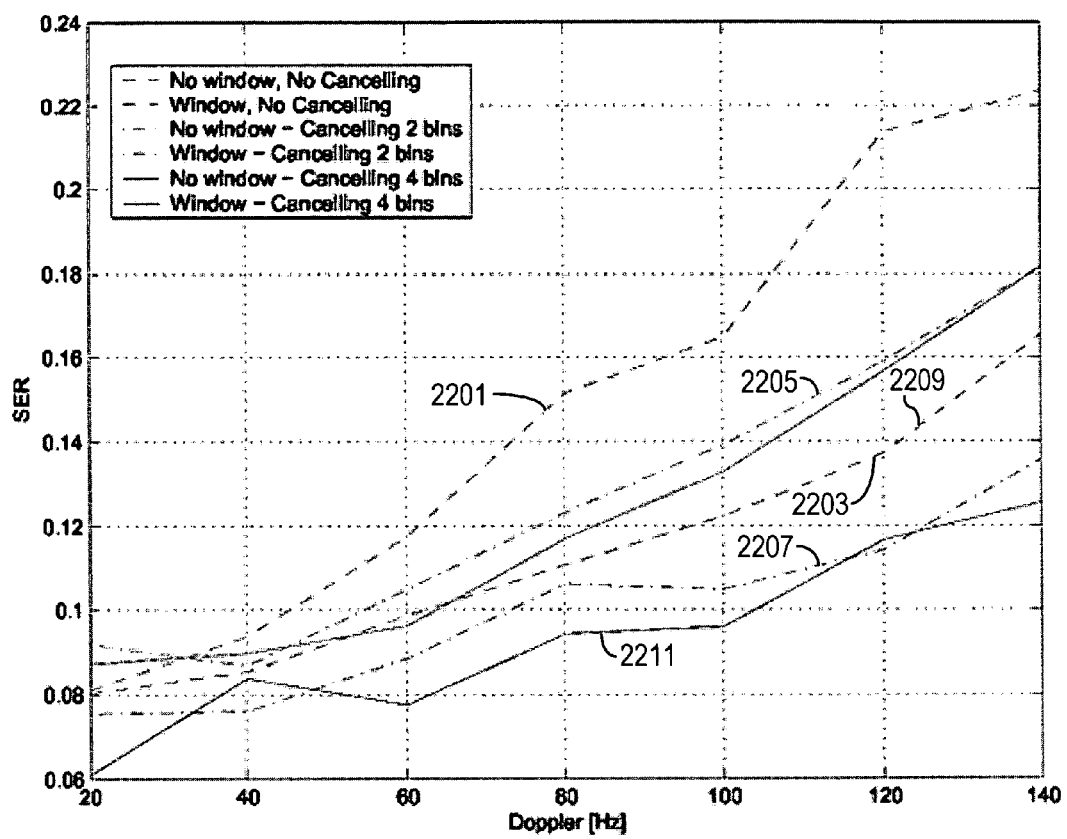
FIG. 22 is a set of graphs showing a comparison simulated SER for ICI cancellation of 2 and 4 bins, with the sent signal estimated as $\hat{S}_K = R_K/\hat{H}_K$ when SNR=20 dB.

FIG. 22 is a set of graphs showing a comparison simulated SER for ICI cancellation of 2 and 4 bins, with the sent signal estimated as $\hat{S}_K = R_K/\hat{H}_K$ when SNR=20 dB. Graph 2201 shows performance when no windowing and no ICI canceling is performed. Graph 2203 shows performance when windowing is performed but no ICI canceling is performed. Graph 2205 is a graph showing performance when no windowing is performed but ICI cancellation of 2 bins is performed. Graph 2207 is a graph showing performance when windowing is performed and ICI cancellation of 2 bins is performed. Graph 2209 is a graph showing performance when no windowing is performed but ICI cancellation of 4 bins is performed. Graph 2211 is a graph showing performance when windowing is performed and ICI cancellation of 4 bins is performed.

Figure 23:
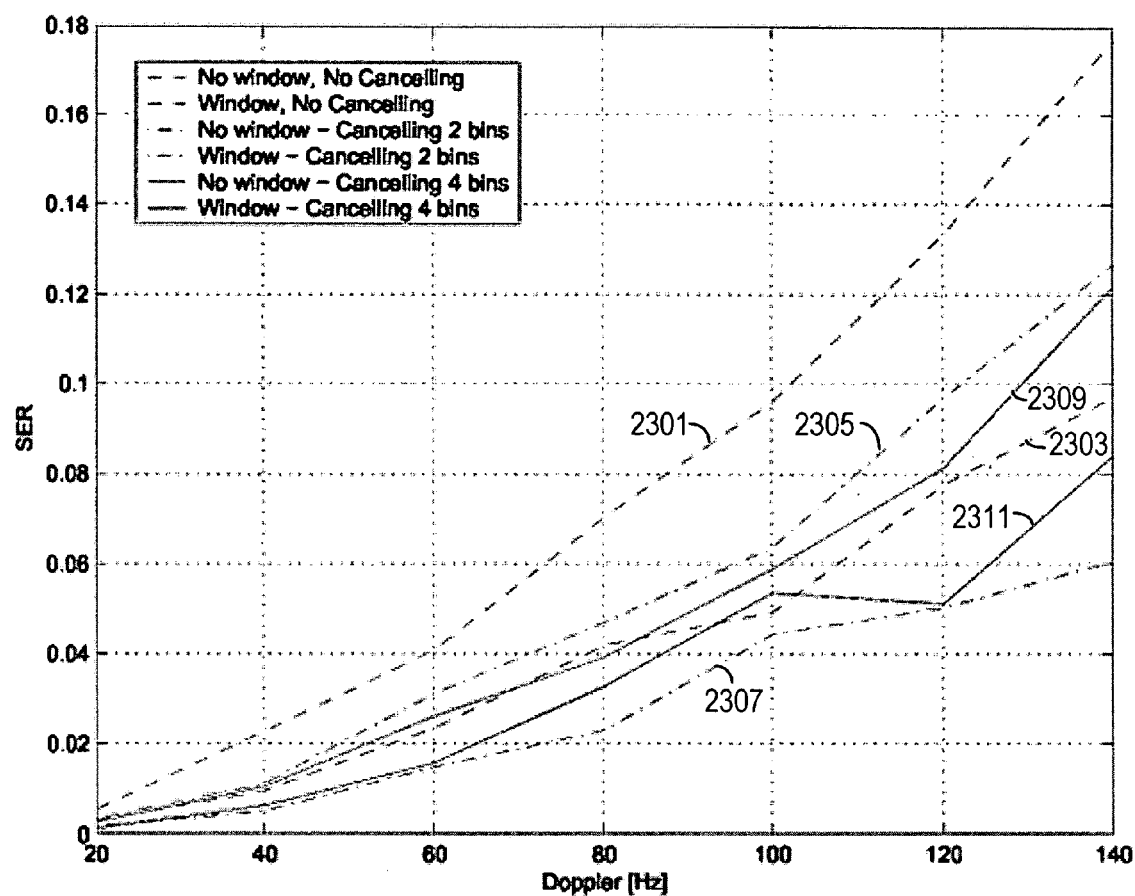
FIG. 23 is a set of graphs showing a comparison simulated SER for ICI cancellation of 2 and 4 bins, with decision directed estimation of the sent signal when SNR=100 dB.

FIG. 23 is a set of graphs showing a comparison simulated SER for ICI cancellation of 2 and 4 bins, with decision directed estimation of the sent signal when SNR=100 dB. Graph 2301 shows performance when no windowing and no ICI canceling is performed. Graph 2303 shows performance when windowing is performed but no ICI canceling is performed. Graph 2305 is a graph showing performance when no windowing is performed but ICI cancellation of 2 bins is performed. Graph 2307 is a graph showing performance when windowing is performed and ICI cancellation of 2 bins is performed. Graph 2309 is a graph showing performance when no windowing is performed but ICI cancellation of 4 bins is performed. Graph 2311 is a graph showing performance when windowing is performed and ICI cancellation of 4 bins is performed.

Figure 24:
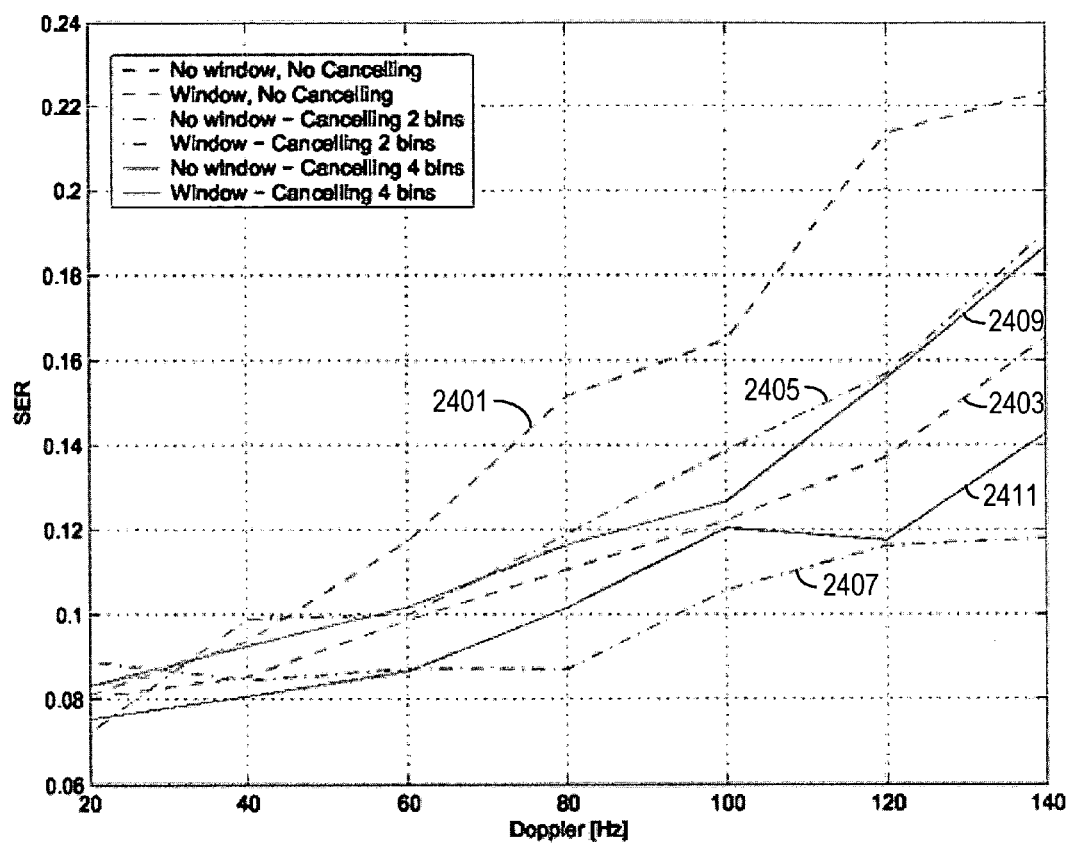
FIG. 24 is a set of graphs showing a comparison simulated SER for ICI cancellation of 2 and 4 bins, with decision directed estimation of the sent signal when SNR=20 dB.

FIG. 24 is a set of graphs showing a comparison simulated SER for ICI cancellation of 2 and 4 bins, with decision directed estimation of the sent signal when SNR=20 dB. Graph 2401 shows performance when no windowing and no ICI canceling is performed. Graph 2403 shows performance when windowing is performed but no ICI canceling is performed. Graph 2405 is a graph showing performance when no windowing is performed but ICI cancellation of 2 bins is performed. Graph 2407 is a graph showing performance when windowing is performed and ICI cancellation of 2 bins is performed. Graph 2409 is a graph showing performance when no windowing is performed but ICI cancellation of 4 bins is performed. Graph 2411 is a graph showing performance when windowing is performed and ICI cancellation of 4 bins is performed.

From the results illustrated in FIGS. 15-24, the following can be concluded:

In case no ICI cancellation is used, the simulated effective SNR agrees reasonably well with that predicted by theory. Here the theoretical effective SNR is defined as $$SNR_{eff} = \frac{C}{N + ICI}. \quad (13)$$

The loss can here be attributed to non-ideal channel estimation.

The gain in Doppler is about 30%, as predicted by the results in Table 1.

When ICI cancellation is applied, windowing makes a significant difference.

If Eqn. (12) is used for estimating the sent signal (i.e., no decision is made), then it seems that increasing the number of canceled bins improves performance, although only marginally when going from 2 to 4 canceled bins.

When a decision directed approach is taken, it appears that canceling only two bins actually gives better results than canceling four.

The decision directed approach gives the best results. The reason for this is believed to be not only because the error is zero in case of a correct decision, but also because for the really poor values of Eqn. (12) (i.e., where the estimated signal has a huge amplitude) an erroneous decision can also mean a significant improvement.

The invention has been described with reference to particular embodiments. However, it will be readily apparent to those skilled in the art that it is possible to embody the invention in specific forms other than those of the embodiment described above.

For example, some alternative embodiments might further improve ICI canceller performance by using the fact that pilot symbols are known, and not treating them as unknown data.

Furthermore, in some embodiments channel estimation can further be improved by using higher order filters. Better channel estimation in turn means better ICI cancellation, since the channel estimates are used in the ICI cancellation process.

Thus, the described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. An apparatus-implemented method of reducing inter-carrier interference (ICI) for a kth sub-carrier of an orthogonal frequency division multiplexing (OFDM) signal received at time t, wherein the received OFDM signal comprises a plurality of sub-carriers, the method comprising:

the apparatus generating a self interference term, $ICI_{k-L,k-L}$, for a signal received on sub-carrier k–L, wherein $L \in [\ldots, -3, -2, -1, 1, 2, 3, \ldots]$, and wherein the self-interference term is an estimate of the data received at time t on the sub-carrier k–L, weighted by a rate of change of the channel through which sub-carrier k–L passes at time t;

obtaining an ICI cancellation coefficient, $G_L$;

generating an estimated ICI term by adjusting the self-interference term, $ICI_{k-L,k-L}$, by an amount based on the ICI cancellation coefficient, $G_L$; and subtracting the estimated ICI term from a term representing a signal received on the kth sub-carrier at the time t, wherein the ICI cancellation coefficient, $G_L$, is determined as a function of a window function, wherein the term representing the signal received on the kth sub-carrier at time t is obtained by performing:

applying the window function to the received OFDM signal to generate a set of selected weighted samples, wherein:

a symbol transmitted on the OFDM signal is represented by N samples;

the window function has a size that is greater than N;

the set of selected weighted samples comprises a central portion of samples, and at least one of an initial portion of samples and a final portion of samples; and the central portion of samples consists of N samples;

performing a wrap function on the set of selected weighted samples to generate a set of N combined weighted samples by, if the set of selected weighted samples includes the initial portion of samples, then combining the initial portion of samples with a like number of samples selected from the central portion of samples, and by, if the set of selected weighted samples includes the final portion of samples, then combining the final portion of samples with a like number of samples selected from the central portion of samples; and performing a Fast Fourier Transform on the N combined weighted samples.

2. The method of claim 1, wherein obtaining the ICI cancellation coefficient, $G_L$, comprises retrieving the ICI cancellation coefficient, $G_L$, from a table stored in a memory device.

3. The method of claim 1, wherein the window function is a Nyquist window.

4. The method of claim 1, wherein the window function is a 3-step window that begins with a step function that increases from a minimum value to a first intermediate value, stays at the first intermediate value over a first period of time, then increases from the first intermediate value to a second intermediate value, stays at the second intermediate value over a second period of time, then increases from the second intermediate value to a third intermediate value, stays at the third intermediate value over a third period of time, then with another step function increases from the third intermediate value to a maximum value, remains at the maximum value for a fourth period of time, then with a step function decreases from the maximum value to the third intermediate value, remains at the third intermediate value for a fifth period of time, then with a step function decreases from the third intermediate value to the second intermediate value, remains at the second intermediate value for a sixth period of time, then with a step function decreases from the second intermediate value to the first intermediate value, remains at the first intermediate value for a seventh period of time, and then with a step function decreases from the first intermediate value to the minimum value.

5. The method of claim 4, wherein the ICI cancellation coefficient is determined in accordance with:

$$G_L = \left( \frac{\cos(\pi L W_{REL}) + \cos\left(\pi L \frac{W_{REL}}{3}\right)}{2 j \pi L} \right),$$

wherein $W_{REL}$ is a size of a roll-off region of the window-function relative to N.

6. The method of claim 1, wherein the window function is a 1-step window that begins with a step function that increases from a minimum value to an intermediate value, stays at the intermediate value over a first period of time, then with another step function increases from the intermediate value to a maximum value, remains at the maximum value for a second period of time, then with a step function decreases from the maximum value to the intermediate value, remains at the intermediate value for a third period of time, and then with a step function decreases from the intermediate value back to the minimum value.

7. The method of claim 1, wherein:

the symbol transmitted on the OFDM signal is preceded by a cyclic prefix; and the method comprises:

estimating an amount of time dispersion of a channel through which the sub-carrier k passes; and adjusting the size of the window function such that it is greater than N but not large enough to extend into a portion of the cyclic prefix that is affected by the time dispersion of the channel.

8. The method of claim 1, comprising:

selecting a shape of the window function based on a length of the window function.

9. The method of claim 1, comprising:

selecting a shape of the window function based on a number of bins being canceled in the OFDM signal received at time t.

10. The method of claim 1, wherein the self-interference term, $ICI_{k-L,k-L}$, is estimated in accordance with:

$$ICI_{k-L,k-L} = \hat{D}_{k-L}(t)\hat{H}_{k-L}'(t)$$

where $\hat{D}_{k-L}(t)$ is an estimate of the data transmitted on sub-carrier k−L at time t, and $\hat{H}_{k-L}(t)$ is an estimate of the derivative of the channel for sub-carrier k−L at time t.

11. The method of claim 10, wherein $\hat{D}_{k-L}(t)$ is determined by using a decision directed technique.

12. The method of claim 1, comprising:

comparing the estimated ICI term with a predetermined Signal-to-Noise Ratio (SNR), wherein the step of subtracting the estimated ICI term from the term representing the signal received on the kth sub-carrier at time t is performed only if the comparison of the estimated ICI term with the predetermined SNR satisfies a predetermined criterion.

13. The method of claim 1, wherein $L = \pm 1$.

14. An apparatus-implemented method of reducing inter-carrier interference (ICI) for a kth sub-carrier of an orthogonal frequency division multiplexing (OFDM) signal received at time t, wherein the received OFDM signal comprises a plurality of sub-carriers, the method comprising:

the apparatus generating a self-interference term, $ICI_{k-L,k-L}$, for a signal received on sub-carrier k−L, wherein $L \in [\ldots, -3, -2, -1, 1, 2, 3, \ldots]$, and wherein the self-interference term is an estimate of the data received at time t on the sub-carrier k−L, weighted by a rate of change of the channel through which sub-carrier k−L passes at time t;

obtaining an ICI cancellation coefficient, $G_L$;

generating an estimated ICI term by adjusting the self-interference term, $ICI_{k-L,k-L}$, by an amount based on the ICI cancellation coefficient, $G_L$; and subtracting the estimated ICI term from a term representing a signal received on the kth sub-carrier at the time t, wherein the ICI cancellation coefficient, $G_L$, is determined as a function of a window function, wherein the self-interference term, $ICI_{k-L,k-L}$, is determined in accordance with:

$$ICI_{k-L,k-L} = \left(\frac{1}{\hat{H}_{k-L}(t)}\right)(D_{k-L}(t)H_{k-L}(t))$$
$$\left[\frac{(\hat{H}_{k-L}(t+T_N+T_{cp}) - \hat{H}_{k-L}(t-T_N-T_{cp}))}{4(1+T_{cp}/T_N)}\right]$$

where:
- $T_N$ is a time duration corresponding to N samples representing a symbol in the OFDM signal;
- $T_{cp}$ is a time duration of a cyclic prefix that precedes the symbol;
- $\hat{H}_{k-L}(t)$ is a current channel estimate for sub-carrier k–L;
- $\hat{H}_{k-L}(t+T_N+T_{cp})$ is a next channel estimate for sub-carrier k–L;
- $\hat{H}_{k-L}(t-T_N-T_{cp})$ is a previous channel estimate for sub-carrier k–L;
- $D_{k-L}(t)$ is a signal actually transmitted at time t on sub-carrier k–L; and
- $H_{k-L}(t)$ is an actual channel on sub-carrier k–L at time t.

15. An apparatus for reducing inter-carrier interference (ICI) for a kth sub-carrier of an orthogonal frequency division multiplexing (OFDM) signal received at time t, wherein the received OFDM signal comprises a plurality of sub-carriers, the apparatus comprising:

logic configured to generate a self-interference term, $ICI_{k-L,k-L}$, for a signal received on sub-carrier k–L, wherein $L \in [\ldots, -3, -2, -1, 1, 2, 3, \ldots]$, and wherein the self-interference term is an estimate of the data received at time t on the sub-carrier k–L, weighted by a rate of change of the channel through which sub-carrier k–L passes at time t;

logic configured to obtain an ICI cancellation coefficient, $G_L$;

logic configured to generate an estimated ICI term by adjusting the self-interference term, $ICI_{k-L,k-L}$, by an amount based on the ICI cancellation coefficient, $G_L$; and logic configured to subtract the estimated ICI term from a term representing a signal received on the kth sub-carrier at the time t, wherein the ICI cancellation coefficient, $G_L$, is determined as a function of a window function, the apparatus further comprising logic configured to generate the term representing the signal received on the kth sub-carrier at time t by performing:

applying the window function to the received OFDM signal to generate a set of selected weighted samples, wherein:
- a symbol transmitted on the OFDM signal is represented by N samples;
- the window function has a size that is greater than N;
- the set of selected weighted samples comprises a central portion of samples, and at least one of an initial portion of samples and a final portion of samples; and the central portion of samples consists of N samples;

performing a wrap function on the set of selected weighted samples to generate a set of N combined weighted samples by, if the set of selected weighted samples includes the initial portion of samples, then combining the initial portion of samples with a like number of samples selected from the central portion of samples, and by, if the set of selected weighted samples includes the final portion of samples, then combining the final portion of samples with a like number of samples selected from the central portion of samples; and performing a Fast Fourier Transform on the N combined weighted samples.

16. The apparatus of claim 15, wherein the logic configured to obtain the ICI cancellation coefficient, $G_L$, comprises logic configured to retrieve the ICI cancellation coefficient, $G_L$, from a table stored in a memory device.

17. The apparatus of claim 15, wherein the window function is a Nyquist window.

18. The apparatus of claim 15, wherein the window function is a 3-step window that begins with a step function that increases from a minimum value to a first intermediate value, stays at the first intermediate value over a first period of time, then increases from the first intermediate value to a second intermediate value, stays at the second intermediate value over a second period of time, then increases from the second intermediate value to a third intermediate value, stays at the third intermediate value over a third period of time, then with another step function increases from the third intermediate value to a maximum value, remains at the maximum value for a fourth period of time, then with a step function decreases from the maximum value to the third intermediate value, remains at the third intermediate value for a fifth period of time, then with a step function decreases from the third intermediate value to the second intermediate value, remains at the second intermediate value for a sixth period of time, then with a step function decreases from the second intermediate value to the first intermediate value, remains at the first intermediate value for a seventh period of time, and then with a step function decreases from the first intermediate value to the minimum value.

19. The apparatus of claim 18, wherein the ICI cancellation coefficient is determined in accordance with:

$$G_L = \left(\frac{\cos(\pi L W_{REL}) + \cos\left(\pi L \frac{W_{REL}}{3}\right)}{2j\pi L}\right),$$

wherein $W_{REL}$ is a size of a roll-off region of the window-function relative to N.

20. The apparatus of claim 15, wherein the window function is a 1-step window that begins with a step function that increases from a minimum value to an intermediate value, stays at the intermediate value over a first period of time, then with another step function increases from the intermediate value to a maximum value, remains at the maximum value for a second period of time, then with a step function decreases from the maximum value to the intermediate value, remains at the intermediate value for a third period of time, and then with a step function decreases from the intermediate value back to the minimum value.

21. The apparatus of claim 15, wherein:
the symbol transmitted on the OFDM signal is preceded by a cyclic prefix; and the apparatus comprises:
logic configured to estimate an amount of time dispersion of a channel through which the sub-carrier k passes; and
logic configured to adjust the size of the window function such that it is greater than N but not large enough to extend into a portion of the cyclic prefix that is affected by the time dispersion of the channel.

22. The apparatus of claim 15, comprising:
logic configured to select a shape of the window function based on a length of the window function.

23. The apparatus of claim 15, comprising:
logic configured to select a shape of the window function based on a number of bins being canceled in the OFDM signal received at time t.

24. The apparatus of claim 15, wherein the logic configured to generate the self-interference term, $ICI_{k-L,k-L}$, estimates the self-interference term, $ICI_{k-L,k-L}$, in accordance with:

$$ICI_{k-L,k-L} = \hat{D}_{k-L}(t)\hat{H}_{k-L}'(t)$$

where $\hat{D}_{k-L}(t)$ is an estimate of the data transmitted on sub-carrier k−L at time t, and $\hat{H}_{k-L}'(t)$ is an estimate of the derivative of the channel for sub-carrier k−L at time t.

25. The apparatus of claim 24, comprising logic configured to use a decision directed technique to determine $\hat{D}_{k-L}(t)$.

26. The apparatus of claim 15, comprising:
logic configured to compare the estimated ICI term with a predetermined Signal-to-Noise Ratio (SNR),
wherein the logic configured to subtract the estimated ICI term from the term representing the signal received on the kth sub-carrier at time t operates only if the comparison of the estimated ICI term with the predetermined SNR satisfies a predetermined criterion.

27. The apparatus of claim 15, wherein L=±1.

28. An apparatus for reducing inter-carrier interference (ICI) for a kth sub-carrier of an orthogonal frequency division multiplexing (OFDM) signal received at time t, wherein the received OFDM signal comprises a plurality of sub-carriers, the method comprising:
logic configured to generate a self-interference term, $ICI_{k-L,k-L}$, for a signal received on sub-carrier k−L, wherein $L \in [\ldots, -3, -2, -1, 1, 2, 3, \ldots]$, and wherein the self-interference term is an estimate of the data received at time t on the sub-carrier k−L, weighted by a rate of change of the channel through which sub-carrier k−L passes at time t;
logic configured to obtain an ICI cancellation coefficient, $G_L$;
logic configured to generate an estimated ICI term by adjusting the self-interference term, $ICI_{k-L,k-L}$, by an amount based on the ICI cancellation coefficient, $G_L$; and
logic configured to subtract the estimated ICI term from a term representing a signal received on the kth sub-carrier at the time t,
wherein the ICI cancellation coefficient, $G_L$, is determined as a function of a window function,
the apparatus further comprising logic configured to determine the self-interference term, $ICI_{k-L,k-L}$, in accordance with:

$$ICI_{k-L,k-L} = \left(\frac{1}{\hat{H}_{k-L}(t)}\right)(D_{k-L}(t)H_{k-L}(t))$$

-continued $$\left[\frac{(\hat{H}_{k-L}(t+T_N+T_{cp}) - \hat{H}_{k-L}(t-T_N-T_{cp}))}{4(1+T_{cp}/T_N)}\right]$$

where:
$T_N$ is a time duration corresponding to N samples representing a symbol in the OFDM signal;
$T_{cp}$ is a time duration of a cyclic prefix that precedes the symbol;
$\hat{H}_{k-L}(t)$ is a current channel estimate for sub-carrier k−L;
$\hat{H}_{k-L}(t+T_N+T_{cp})$ is a next channel estimate for sub-carrier k−L;
$\hat{H}_{k-L}(t-T_N-T_{cp})$ is a previous channel estimate for sub-carrier k−L;
$D_{k-L}(t)$ is a signal actually transmitted at time t on sub-carrier k−L; and
$H_{k-L}(t)$ is an actual channel on sub-carrier k−L at time t.

29. An Orthogonal Frequency Division Multiplexing (OFDM) receiver, comprising:
logic configured to apply a window function to a received OFDM signal;
logic configured to generate one or more self-interference terms for one or more respective sub-carriers of the OFDM signal, wherein each of the one or more self-interference terms is an estimate of data received at a time t on a sub-carrier, weighted by a rate of change of a channel through which the sub-carrier passes at time t; and
logic configured to reduce inter-carrier interference in the received OFDM signal dependent on the one or more self-interference terms and the window function by:
ascertaining one or more cancellation coefficients that are a function of the window function;
using the cancellation coefficients to scale the one or more self-interference terms; and
subtracting each of the scaled one or more self-interference terms from portions of the OFDM signal received on one or more neighboring sub-carriers,
wherein the portions of the OFDM signal received on one or more neighboring sub-carriers are obtained by performing:
applying the window function to the received OFDM signal to generate a set of selected weighted samples, wherein:
a symbol transmitted on the OFDM signal is represented by N samples;
the window function has a size that is greater than N;
the set of selected weighted samples comprises a central portion of samples, and at least one of an initial portion of samples and a final portion of samples; and
the central portion of samples consists of N samples;
performing a wrap function on the set of selected weighted samples to generate a set of N combined weighted samples by, if the set of selected weighted samples includes the initial portion of samples, then combining the initial portion of samples with a like number of samples selected from the central portion of samples, and by, if the set of selected weighted samples includes the final portion of samples, then combining the final portion of samples with a like number of samples selected from the central portion of samples; and
performing a Fast Fourier Transform on the N combined weighted samples.

* * * * *

UNITED STATES PATENT AND TRADEMARK OFFICE
CERTIFICATE OF CORRECTION

PATENT NO. : 7,706,428 B2
APPLICATION NO. : 11/350807
DATED : April 27, 2010
INVENTOR(S) : Wilhelmsson et al.

It is certified that error appears in the above-identified patent and that said Letters Patent is hereby corrected as shown below:

IN THE SPECIFICATIONS:

In Column 12, Line 55, insert -- Note the sign --.

In Column 14, Line 9, delete "example.:" and insert -- example: --, therefor.

In Column 19, Line 34, delete "$r_{-1}$," and insert -- $r_{-1}$ --, therefor.

IN THE CLAIMS:

In Column 24, Line 61, in Claim 1, delete "self interference" and insert -- self-interference --, therefor.

In Column 25, Line 7, in Claim 1, delete "at the" and insert -- at --, therefor.

In Column 26, Line 42, in Claim 10, delete " $\hat{H}_{k\text{-}१}(t)$ " and insert -- $\hat{H}_{k\text{-}L}'(t)$ --, therefor.

In Column 27, Line 6, in Claim 14, delete "at the" and insert -- at --, therefor.

In Column 27, Line 53, in Claim 15, delete "at the" and insert -- at --, therefor.

In Column 29, Line 40, in Claim 28, delete "method" and insert -- apparatus --, therefor.

In Column 29, Line 56, in Claim 28, delete "at the" and insert -- at --, therefor.

Signed and Sealed this
Twenty-sixth Day of February, 2013

Teresa Stanek Rea
*Acting Director of the United States Patent and Trademark Office*